United States Patent
Lin et al.

(10) Patent No.: US 12,484,555 B2
(45) Date of Patent: Dec. 2, 2025

(54) POULTRY VOICEPRINT IDENTIFICATION METHOD AND SYSTEM

(71) Applicant: iChase Co., Ltd., Taipei (TW)

(72) Inventors: Chieh-yu Lin, Taipei (TW); Kuang-fu Chang, Taipei (TW); Li-wan Huang, Taipei (TW)

( * ) Notice: Subject to any disclaimer, the term of this patent is extended or adjusted under 35 U.S.C. 154(b) by 251 days.

(21) Appl. No.: 18/132,471

(22) Filed: Apr. 10, 2023

(65) Prior Publication Data
US 2023/0320329 A1    Oct. 12, 2023

(30) Foreign Application Priority Data

Apr. 11, 2022 (TW) .................................. 111113745
Mar. 6, 2023 (TW) .................................. 112108161

(51) Int. Cl.
| | |
|---|---|
| A01K 29/00 | (2006.01) |
| A01K 45/00 | (2006.01) |
| G10L 17/02 | (2013.01) |
| G10L 17/04 | (2013.01) |
| G10L 17/26 | (2013.01) |

(52) U.S. Cl.
CPC ............ A01K 29/005 (2013.01); A01K 45/00 (2013.01); G10L 17/02 (2013.01); G10L 17/04 (2013.01); G10L 17/26 (2013.01)

(58) Field of Classification Search
CPC ...... A01K 29/005; A01K 45/00; G10L 17/02; G10L 17/04; G10L 17/26
USPC ........................................................ 704/243
See application file for complete search history.

(56) References Cited

U.S. PATENT DOCUMENTS

| | | | | |
|---|---|---|---|---|
| 2017/0133041 | A1* | 5/2017 | Mortensen | G10L 15/02 |
| 2019/0088271 | A1* | 3/2019 | Lee | G10L 25/66 |
| 2023/0320329 | A1* | 10/2023 | Lin | G10L 17/02 |
| | | | | 704/243 |
| 2024/0206434 | A1* | 6/2024 | Chang | G06V 20/52 |
| 2024/0341282 | A1* | 10/2024 | Chang | G01G 17/08 |

FOREIGN PATENT DOCUMENTS

| | | | | |
|---|---|---|---|---|
| CN | 101217036 | | 3/2011 | |
| CN | 109243470 | A * | 1/2019 | ............ A01K 45/00 |
| CN | 213781584 | | 7/2021 | |

* cited by examiner

*Primary Examiner* — Edwin S Leland, III
(74) *Attorney, Agent, or Firm* — OPES IP Consulting Co., Ltd.

(57) ABSTRACT

A poultry voiceprint identification system includes a receiver, a feature processing module, a feature analysis module and an artificial intelligence sound model. The receiver is arranged in a poultry house for receiving a recording information of a poultry house for a period of time. A stocking density of poultry in the poultry house is 7 per square meter or more. The feature processing module converts the recording information into a plurality of sound features via filtering, segmentation and extraction methods. The artificial intelligence sound model generates a training group according to the sound features. The feature analysis module analyzes each sound feature to determine a sound state of each sound feature through an artificial intelligence sound model. The sound state includes a normal poultry sound state or an abnormal poultry sound state. The system accurately and quickly identifies the sound from abnormal poultry among high stocking density poultry.

14 Claims, 22 Drawing Sheets

POULTRY VOICEPRINT IDENTIFICATION METHOD AND SYSTEM

CROSS REFERENCE TO RELATED APPLICATIONS

This application claims the benefit of priority of Taiwan Patent Application No. 111113745 filed on Apr. 11, 2022, titled "POULTRY VOICEPRINT IDENTIFICATION METHOD AND SYSTEM", and the disclosure of which is incorporated herein by reference. In addition, this application further claims the benefit of priority of Taiwan Patent Application No. 112108161 filed on Mar. 6, 2023, titled "POULTRY VOICEPRINT IDENTIFICATION METHOD AND SYSTEM", and the disclosure of which is incorporated herein by reference.

FIELD OF THE INVENTION

The present disclosure relates to a voiceprint identification method and system, and in particular to a poultry voiceprint identification method and system.

BACKGROUND OF THE INVENTION

At present, modern poultry industry is mostly characterized by large-scale and intensive farming (e.g., raising 7 or more poultry per square meter), which promotes the spread of diseases. When there is a poultry infection in the poultry house, the disease spreads to the whole poultry house very quickly, which leads to significant economic losses to the poultry industry every year. The main viral diseases include Avian Influenza (AI), Newcastle Disease (ND), Infectious Bronchitis (IB), Infectious Laryngotracheitis, and others. Among them, Infectious Bronchitis (IB) is one of the most important respiratory diseases in Asia. In general, infected poultry will have symptoms such as tracheal rales, coughing, sneezing, runny nose, decreased egg production, and decreased feed conversion rate. In addition, infected poultry usually show vocal changes before more serious symptoms are developed. Early detection of the vocal changes in poultry, especially detection of infected poultry sound, will provide a good warning effect.

However, the observation of poultry diseases often relies on human experience. In addition, due to the large-scale and intensive farming in the modern poultry industry, many types of poultry sounds and non-poultry sounds are often mixed, therefore it is even more difficult to identify abnormal poultry sounds from among a mixture of many poultry sounds and non-poultry sounds.

SUMMARY OF THE INVENTION

Therefore, the present disclosure proposes a poultry voiceprint identification method and system, which can improve the aforementioned conventional problems.

According to an embodiment of the present disclosure, a poultry voiceprint identification method is proposed. The poultry voiceprint identification method comprises the following step of: receiving a recording information of a poultry house for a period of time, the poultry house has a plurality of poultry, and wherein a stocking density of poultry in the poultry house is 7 per square meter or more. The poultry voiceprint identification method further comprises the step of: converting the recording information into a plurality of sound features, wherein the step of converting the recording information into the plurality of sound features comprises steps of: filtering out the recording information to generate a filtered recording information with a specific frequency range; dividing the filtered recording information into a plurality of sound information though a frequency domain; and extracting the plurality of sound features from the plurality of sound information. The poultry voiceprint identification method further comprises the step of: analyzing each of the plurality of sound features to determine a sound state of each of the plurality of sound features, wherein the sound state includes a normal poultry sound state or an abnormal poultry sound state.

In some embodiments of the present disclosure, the step of filtering the recording information to generate the filtered recording information with the specific frequency range is implemented by band-pass filtering and spectral subtraction.

In some embodiments of the present disclosure, the step of extracting the plurality of sound features from the plurality of sound information is implemented by openSMILE, Wavelet or short-time distance Fourier transform.

In some embodiments of the present disclosure, the poultry voiceprint identification method further comprises steps of: storing the sound state of the recording information in a database through a network; and providing a user interface for allowing a user to observe the sound status in the database through the network.

In some embodiments of the present disclosure, the step of analyzing each of the plurality of sound features to determine the sound state of each of the plurality of sound features is determined through an artificial intelligence sound model, wherein the artificial intelligence sound model is configured for generating a training set based on the plurality of sound features and using the training set to train the feature analysis module, wherein the training set includes a recognition condition recording the normal poultry sound state and the abnormal poultry sound state.

In some embodiments of the present disclosure, the artificial intelligence sound model classifies each of the plurality of sound features as a poultry sound state or a non-poultry sound state through a support vector machine, if one of the plurality of sound features belongs to the poultry sound state, the artificial intelligence sound model classifies said one of the plurality of sound features belonging to the poultry sound state as the normal poultry sound state or the abnormal poultry sound state through the support vector machine.

According to another embodiment of the present disclosure, a poultry voiceprint identification system installed on a server connected to a network is proposed. The poultry voiceprint identification system comprises a receiver, a feature processing module and a feature analysis module.

The receiver is arranged in a poultry house and configured for receiving a recording information of a poultry house for a period of time, the poultry house has a plurality of poultry, wherein a stocking density of poultry in the poultry house is equal to or greater than 7 per square meter. The feature processing module is configured for converting the recording information into a plurality of sound features, wherein the feature processing module further comprises: a filtering unit, configured for filtering out the recording information to generate a filtered recording information with a specific frequency range; a segmentation unit, configured for dividing the filtered recording information into a plurality of sound information though a frequency domain method; and an extraction unit, configured for extracting the plurality of sound features from the plurality of sound information. The feature analysis module is configured for analyzing each of the plurality of sound features to determine a sound state of each of the plurality of sound features through an artificial intelligence sound model, and the sound state includes a normal poultry sound state or an abnormal poultry sound state.

In some embodiments of the present disclosure, the filtering unit is further configured for implementing the step of filtering the recording information to generate the filtered recording information with the specific frequency range by band-pass filtering and spectral subtraction.

In some embodiments of the present disclosure, the extraction unit is further configured for implementing the step of extracting the plurality of sound features from the plurality of sound information by openSMILE, Wavelet or short-time distance Fourier transform.

In some embodiments of the present disclosure, the poultry voiceprint identification system further comprises: a database, configured for storing the sound state of the recording information through the network; and a user interface, configured for allowing a user to observe the sound status in the database through the network.

In some embodiments of the present disclosure, the feature analysis module is further configured for using an artificial intelligence sound model in the step of analyzing each of the plurality of sound features to determine the sound state of each of the plurality of sound features, wherein the artificial intelligence sound model is configured for generating a training set based on the plurality of sound features and using the training set to train the feature analysis module, wherein the training set includes a recognition condition recording the normal poultry sound state and the abnormal poultry sound state.

In some embodiments of the present disclosure, the artificial intelligence sound model classifies each of the plurality of sound features as a poultry sound state or a non-poultry sound state through a support vector machine, if one of the plurality of sound features belongs to the poultry sound state, the artificial intelligence sound model classifies said one of the plurality of sound features belonging to the poultry sound state as the normal poultry sound state or the abnormal poultry sound state through the support vector machine.

BRIEF DESCRIPTION OF DRAWINGS

The above and other aspects of the invention will become better understood with regard to the following detailed description of the preferred but non-limiting embodiment (s). The following description is made with reference to the accompanying drawings.

DETAILED DESCRIPTION OF PREFERRED EMBODIMENTS

Figure 1:
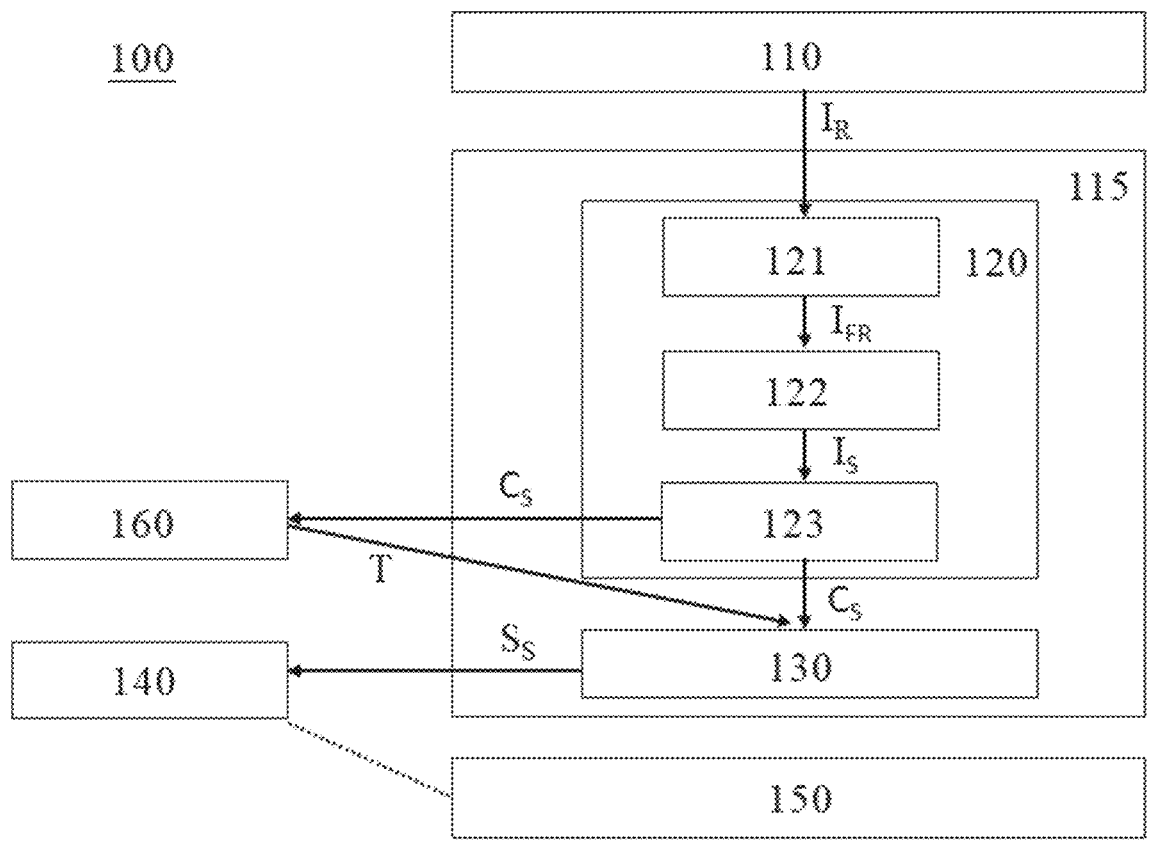
FIG. 1 shows a schematic diagram of a poultry voiceprint identification system according to an embodiment of the present disclosure.

Referring to FIG. 1, a schematic diagram of a poultry voiceprint identification system according to an embodiment of the present disclosure is shown. A poultry voiceprint identification system 100 is installed on a server (not shown) connected to a network (not shown). The poultry voiceprint identification system 100 comprises a receiver 110 and a processor 115. The processor 115 comprises a feature processing module 120 and a feature analysis module 130. The receiver 110 is arranged in a poultry house and is configured for receiving a recording information IR of a poultry house for a period of time. The feature processing module 120 is configured for converting the recording information IR into a plurality of sound features Ss. The feature analysis module 130 is configured for analyzing the recording information IR to determine the sound state Ss of the recording information IR, or configured for analyzing each of the plurality of sound features $C_S$ to determine the sound state Ss of each of the plurality of sound features $C_S$. The sound state Ss includes a normal poultry sound state and/or an abnormal poultry sound state. In some embodiments, the receiver 110 and the processor 115 can be integrated in a device (not shown; such as a single-chip microcomputer Raspberry Pi) disposed in the poultry house.

The feature processing module 120 further comprises a filtering unit 121, a segmentation unit 122 and an extraction unit 123. The filtering unit 121 is configured for filtering out the recording information IR to generate a filtered recording information $I_{FR}$ with a specific frequency range. The dividing unit 122 is configured for dividing the filtered recording information $I_{FR}$ into a plurality of sound information $I_S$. The extraction unit 123 is configured for extracting a plurality of sound features $C_S$ from the plurality of sound information $I_S$.

The poultry voiceprint identification system 100 further comprises a database 140 and a user interface 150. The database 140 is configured for storing the sound state Ss of the recording information IR (or the sound state Ss of each of the plurality of sound features $C_S$) through the network. The user interface 150 is configured for allowing a user to observe the sound status Ss in the database 140 through the network.

The feature analysis module 130 is further configured for using an artificial intelligence sound model 160 in the step of analyzing each of the plurality of sound features $C_S$ to determine the sound state Ss of each of the plurality of sound features $C_S$, wherein the artificial intelligence sound model 160 is configured for generating a training set T based on the plurality of sound features $C_S$ and using the training set T to train the feature analysis module 120. The training set T includes a recognition condition recording the normal poultry sound state and the abnormal poultry sound state.

The artificial intelligence sound model 160 classifies each of the plurality of sound features $C_S$ as a poultry sound state or a non-poultry sound state through a support vector machine. If one of the plurality of sound features $C_S$ belongs to the poultry sound state, the artificial intelligence sound model classifies said one of the plurality of sound features $C_S$ belonging to the poultry sound state as the normal poultry sound state or the abnormal poultry sound state through the support vector machine.

Figure 2:
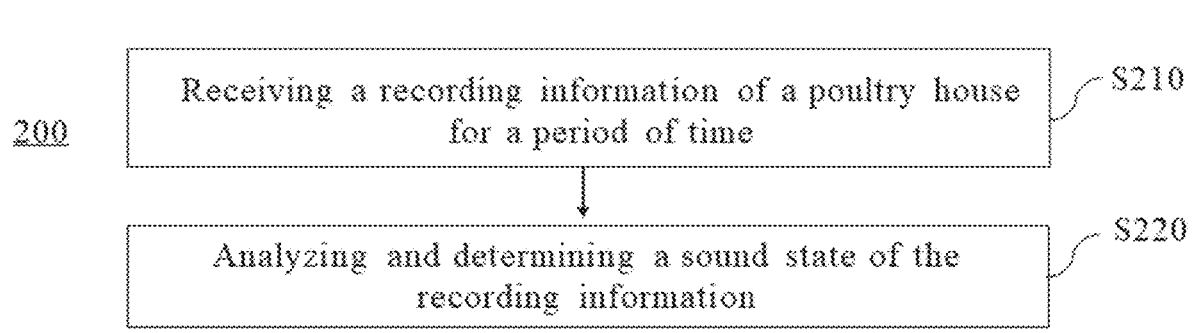
FIG. 2 shows a schematic diagram of a poultry voiceprint identification method according to an embodiment of the present disclosure.

Referring to FIG. 2, a schematic diagram of a poultry voiceprint identification method 200 according to an embodiment of the present disclosure is shown. The poultry voiceprint identification method 200 at least comprises steps S210 and S220, which are described in detail as follows.

In step S210, referring to FIG. 1, the receiver 110 is configured for receiving a recording information IR of a poultry house for a period of time.

In step S220, the feature analysis module 130 is configured for analyzing and determining a sound state Ss of the recording information IR.

Figure 3:
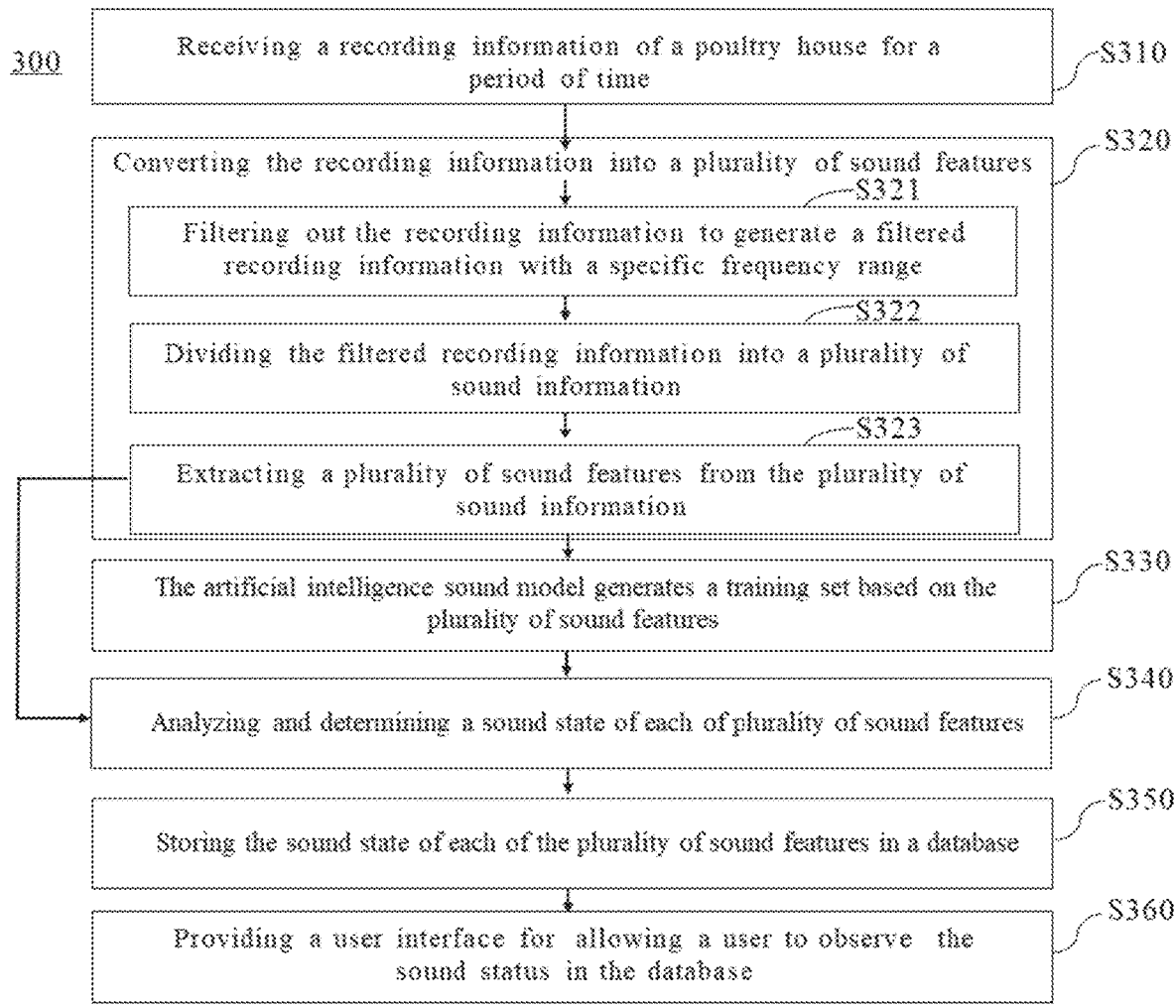
FIG. 3 shows a schematic diagram of a poultry voiceprint identification method according to another embodiment of the present disclosure.

Referring to FIG. 3, a schematic diagram of a poultry voiceprint identification method 300 according to another embodiment of the present disclosure is shown. The poultry voiceprint identification method 300 at least comprises steps S310, S320, S330, S340, S350 and S360, which are described in detail as follows.

In step S310, the receiver 110 is configured for receiving a recording information $I_R$ of a poultry house for a period of time. The poultry house has a plurality of poultry, and a stocking density of poultry in the poultry house is equal to or greater than 7 per square meter, equal to or greater than 8 per square meter, equal to or greater than 10 per square meter, equal to or greater than 12 per square meter, equal to or greater than 14 per square meter, equal to or greater than 16 per square meter, equal to or greater than 18 per square meter, or equal to or greater than 20 per square meter. For example, a stocking density of poultry in the poultry house can be 8 per square meter to 20 per square meter, 10 per square meter to 20 per square meter, 12 per square meter to 20 per square meter, 14 per square meter to 20 per square meter, 16 per square meter to 20 per square meter, 12 per square meter to 16 per square meter, 14 per square meter to 16 per square meter. In particular, a stocking density of poultry in the poultry house can be equal to or greater than 7 per square meter, or equal to or greater than 16 per square meter. Therefore, compared with other animals with lower stocking density (for example, a stocking density of pigs being 1/square meter), the recording information $I_R$ of poultry houses with a higher stocking density (e.g., 8 per square meter to 20 per square meter) usually receives a higher density of poultry sounds at the same time, and the recording information $I_R$ of poultry houses with a higher stocking density usually receives more object collision sounds, friction sounds and so on.

If the voiceprint identification method for raising other animals with lower stocking density (such as pigs) is applied to the voiceprint identification method for poultry houses with higher stocking density, there is a great probability that each sound information cannot be clearly identified for poultry houses. Therefore, the voiceprint identification method for raising other animals with lower stocking density cannot be simply applied to the voiceprint identification method for poultry houses with higher stocking density. As above, in terms of data collection, since the poultry stocking density in the poultry house is much higher than that of other animals (such as pig stocking density), the requirements for various methods of voiceprint identification will be more stringent. Therefore, the present disclosure designs an effective poultry voiceprint identification method for poultry houses with high stocking density.

Figure 4A:
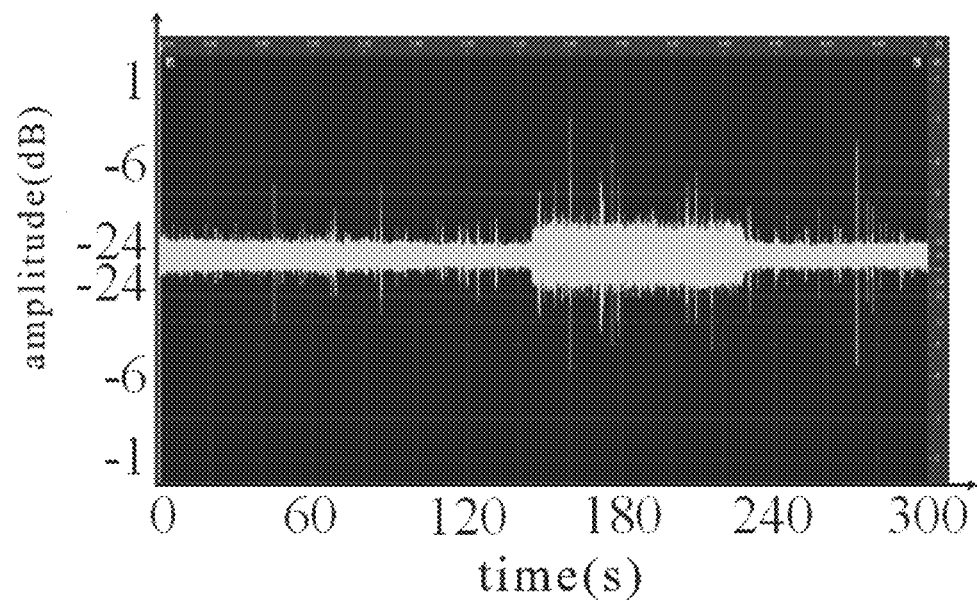
FIG. 4A shows a waveform diagram of the original poultry recording information according to an embodiment of the present disclosure.
Figure 4B:
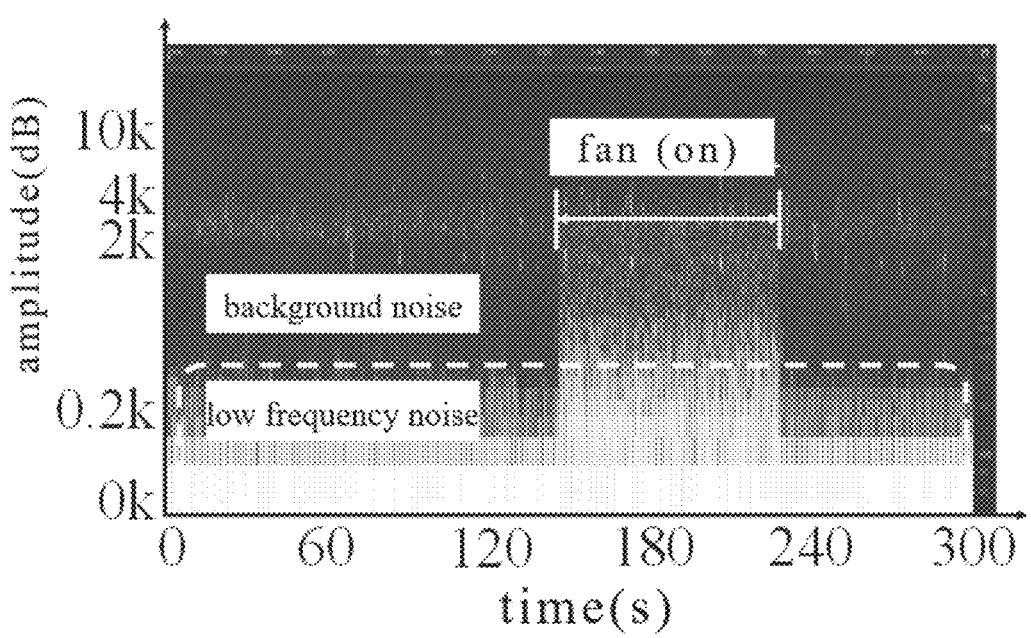
FIG. 4B shows a time-frequency diagram of the original poultry recording information according to an embodiment of the present disclosure.

In some embodiments, the receiver 110 is at least one of an omnidirectional microphone and a directional microphone. In some embodiments, the receiver 110 is preferably a directional microphone. As shown in FIG. 4A to FIG. 4B, the recording information $I_R$ received by the receiver 110 may include a waveform diagram or a time-frequency diagram. As shown in FIG. 4A, the waveform of the recording information $I_R$ presented in the waveform diagram is not obvious due to the interference of noise. As shown in FIG. 4B, the recording information $I_R$ presented in the time-frequency diagram includes background noise with a frequency similar to that of poultry, and the background noise includes but not limited to the sound of fans running, the sound of cars and rain outside the poultry house. However, these background noises will cause errors in subsequent eigenvalue calculations and affect the classification results. Therefore, it is necessary to filter the recording information $I_R$ before the analysis step.

In step S320, the feature processing module 120 converts the recording information $I_R$ into a plurality of sound features $C_S$. The initial strength and duration of poultry sounds (i.e., the sounds emitted from the throat) will vary between different frequency bands. In order to reduce the impact of high-density poultry sounds (i.e., the sounds emitted from the throat), the pre-processing of sound signals becomes particularly important. Therefore, the step S320 may further comprises step S321, step S322 and step S323. The feature processing module 120 may comprises a filtering unit 121, a segmentation unit 122 and an extraction unit 123.

In step S321, the filtering unit 121 is configured for filtering out the recording information $I_R$ to generate a filtered recording information $I_{FR}$ with a specific frequency range. In some embodiments, the filtered recording information $I_{FR}$ has a specific frequency range between about 500 Hz and about 5 kHz. In some embodiments, the method for implementing the step S321 includes but is not limited to using a filter, spectral subtraction, spectral gating, noise gating, multi-microphone noise reduction, noise reduce or other methods, which can improve the signal-to-noise ratio. Wherein, the filter includes but not limited to the adapter filter, finite pulse filter (FIR) or infinite pulse filter (IIR), wherein the finite pulse filter (FIR) or infinite pulse filter (IIR) is, for example, a high-pass filter, a band-pass filter, a low-pass filter or band-stop filter.

In some embodiments, the filtering unit 121 comprises, for example, a Butterworth filter, and the filtering unit 121 is configured for performing the step S321 with bandpass filtering, and the amplitude gain of the n-order Butterworth low-pass filter can be expressed as the following equation (1), where Ha is the transfer function, N is the order of the filter, w is the angular frequency of the signal, and (pc is the cutoff frequency when the amplitude drops by 3 dB. As the order of the filter is higher, the amplitude attenuation speed of the filter in the stop band is faster, and the filtering effect is better. Wherein, the recording information $I_R$ with the frequency lower than (pc will pass through with gain, and the recording information $I_R$ with the frequency higher than (pc will be suppressed.

$$|H_a(j\omega)|^2 = \frac{1}{1 + (\omega/\omega_c)^{2N}} \quad (1)$$

Figure 5A:
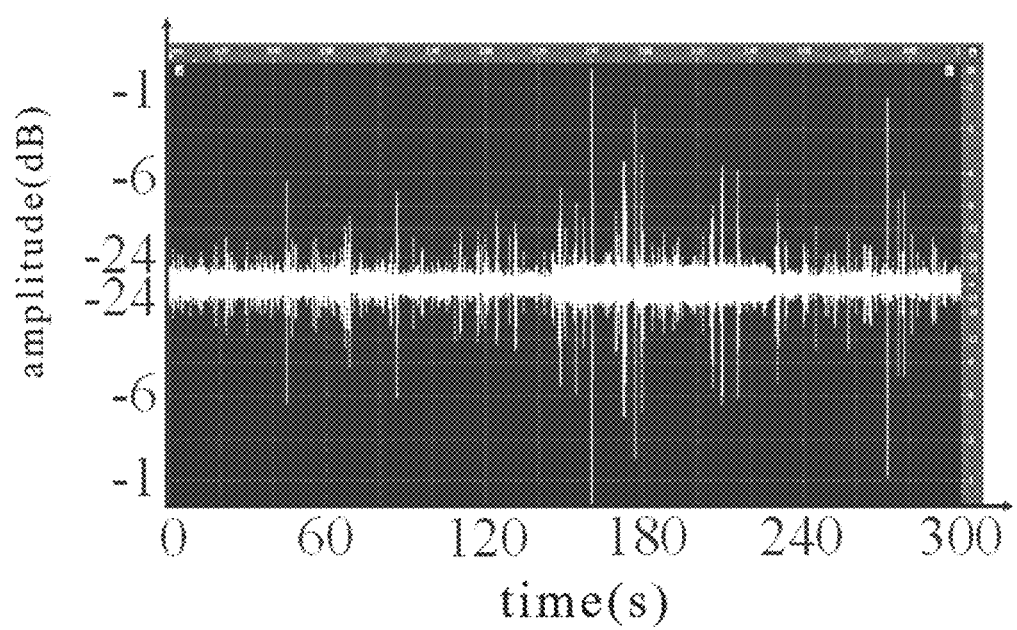
FIG. 5A shows a waveform diagram of the original poultry recording information after band-pass filtering according to an embodiment of the present disclosure.
Figure 5B:
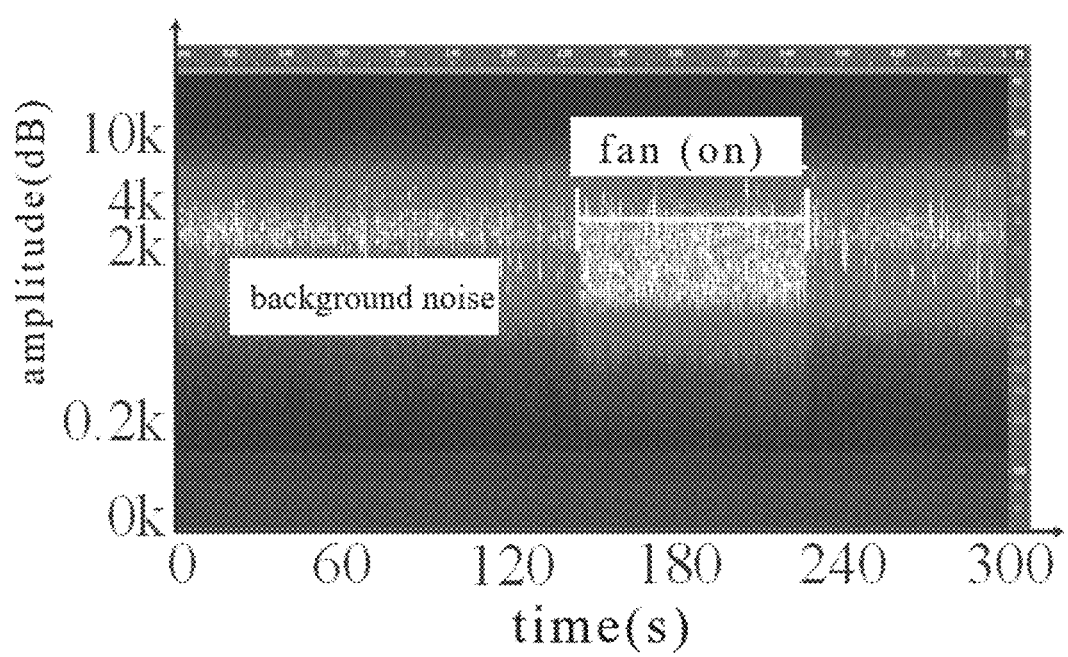
FIG. 5B shows a time-frequency diagram of the original poultry recording information after band-pass filtering according to an embodiment of the present disclosure.

In addition to high and low frequency background noise interference, there is also background noise interference with a frequency similar to that of poultry sound in the received recording information $I_R$, as shown in FIG. 5B. However, in this case, if the band-pass filter is directly used to suppress the background noise close to the frequency of the poultry sound, it will also lead to the elimination of the poultry sound.

Figure 6A:
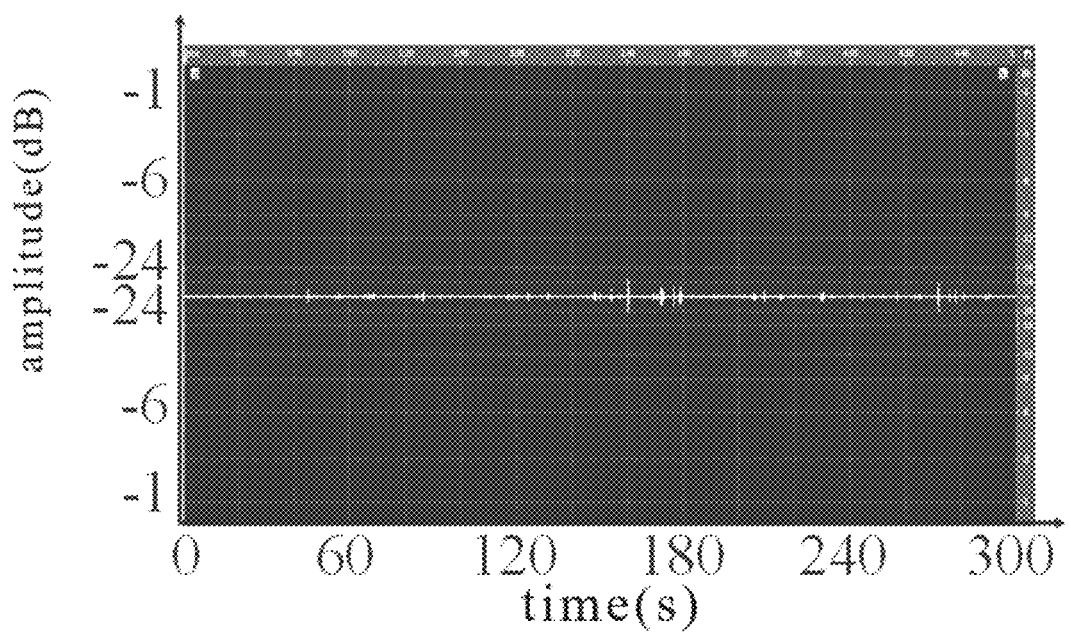
FIG. 6A shows a waveform diagram of the original poultry recording information after spectral subtraction according to an embodiment of the present disclosure.
Figure 6B:
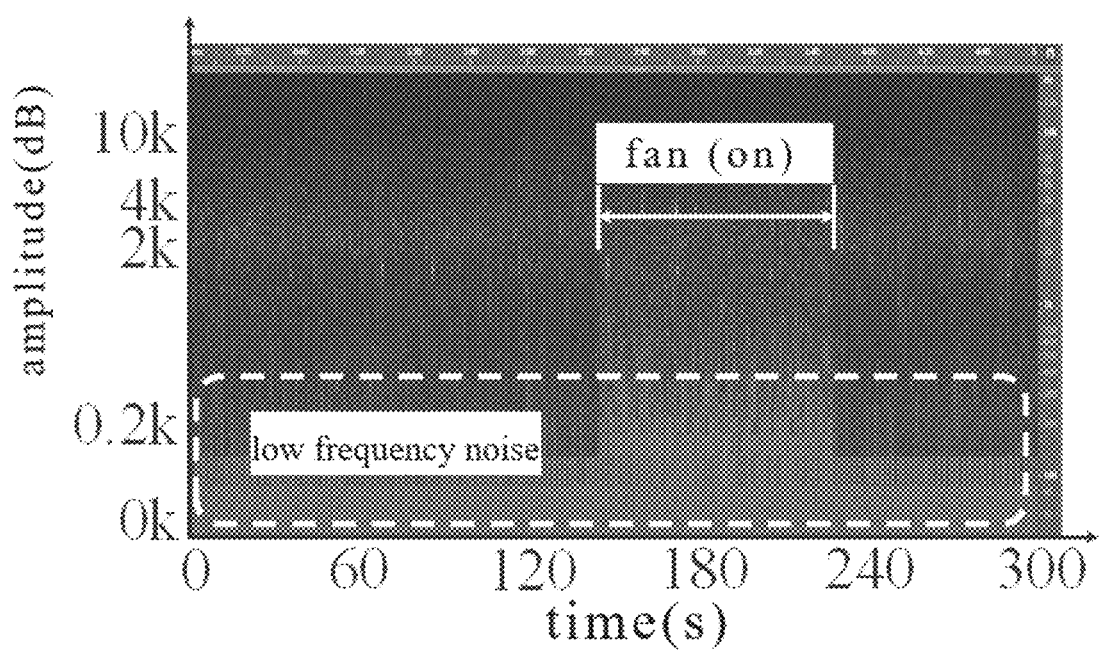
FIG. 6B shows a time-frequency diagram of the original poultry recording information after spectral subtraction according to an embodiment of the present disclosure.

In addition, in some other embodiments, the step S321 is implemented by spectral subtraction, as shown in FIG. 6A to FIG. 6B. Spectral subtraction is based on a simple assumption that only additive noise exists in the noise in the speech signal, as long as the spectrum of the noisy signal is subtracted from the spectrum of the noise signal, a relatively clean pure speech spectrum can be obtained. The signal model in the time domain can be expressed as the following equation (2), where y(m) is a noisy signal, x(m) is an additive noise, d(m) is a pure speech signal, and m is time.

$$y(m)=x(m)+d(m), \text{ converted into } d(m)=y(m)-x(m) \quad (2)$$

Figure 7A:
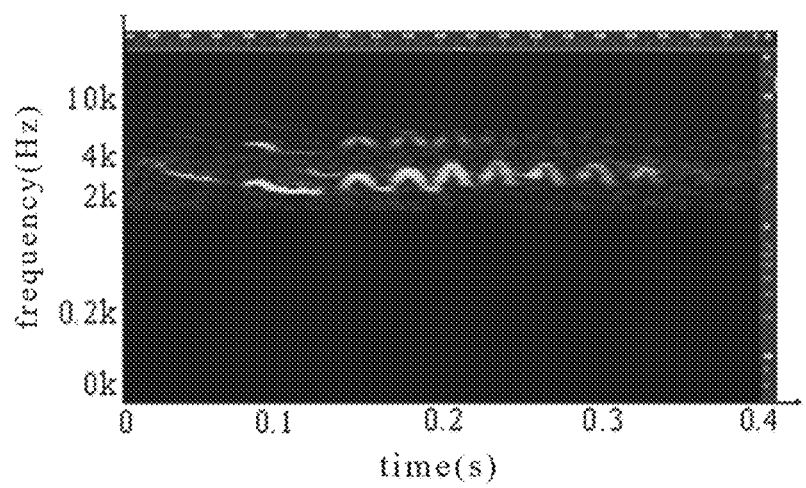
FIG. 7A shows a time-frequency diagram of poultry sounds in the original recording information according to an embodiment of the present disclosure.
Figure 7B:
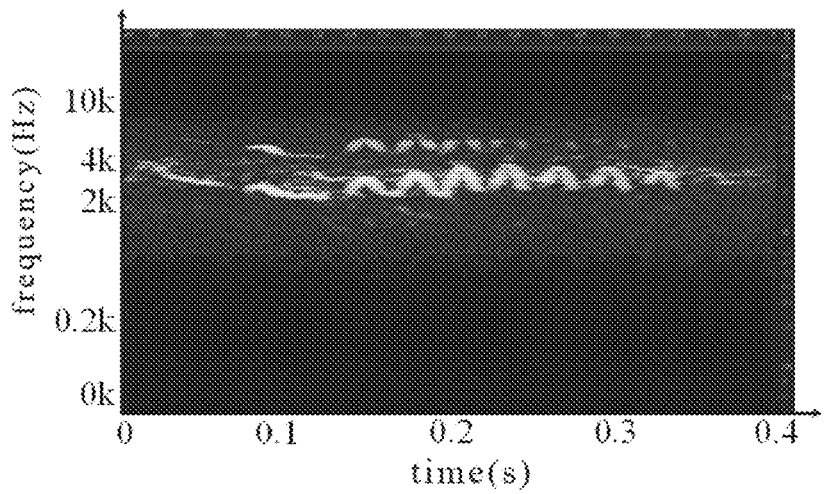
FIG. 7B shows a time-frequency diagram of poultry sounds in the filtered recording information after bandpass filtering according to an embodiment of the present disclosure.
Figure 7C:
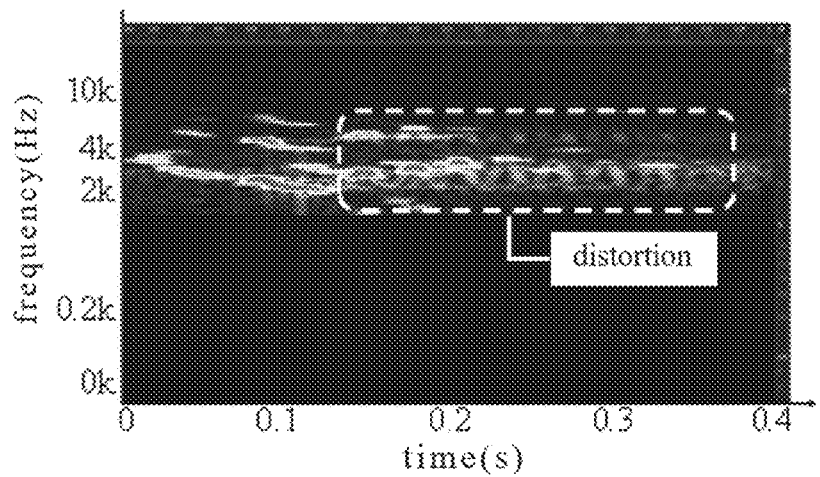
FIG. 7C shows a time-frequency diagram of poultry sounds in the filtered recording information after spectral subtraction according to an embodiment of the present disclosure.

In the whole section of filtered recording information $I_{FR}$, the background noise after spectral subtraction (as shown in FIG. 6B) is suppressed much more than after band-pass filtering (as shown in FIG. 5B). Therefore, compared with band-pass filtering, spectral subtraction can effectively eliminate background noise close to the frequency of poultry sound, i.e., spectral subtraction can effectively eliminate background noise within the band-pass band. However, referring to FIG. 6B, compared with band-pass filtering, spectral subtraction cannot effectively suppress low-frequency noise. In addition, referring to FIG. 7A to FIG. 7C, when the signal-to-noise ratio is too low, the spectral subtraction may cause sound distortion after filtering (as shown in FIG. 7C).

Figure 8A:
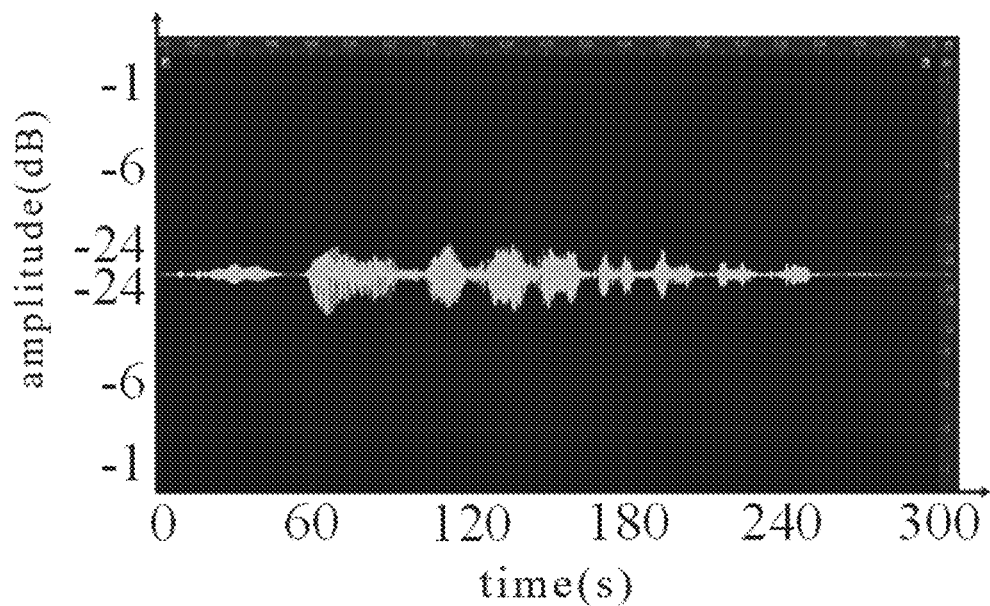
FIG. 8A shows a waveform diagram of poultry sounds in the filtered recording information processed by bandpass filtering and spectral subtraction according to an embodiment of the present disclosure.
Figure 8B:
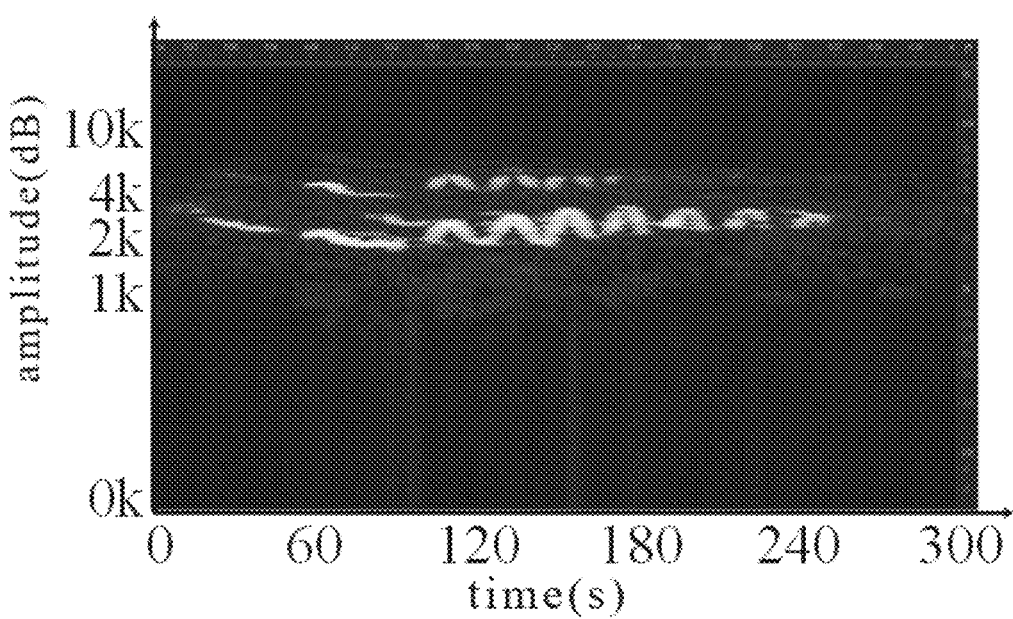
FIG. 8B shows a time-frequency diagram of poultry sounds in the filtered recording information after bandpass filtering and spectral subtraction processing according to an embodiment of the present disclosure.

In addition, in some other embodiments, the step S321 is implemented by bandpass filtering and spectral subtraction. Referring to FIG. 8A to FIG. 8B, after suppressing most of the high- and low-frequency noise through band-pass filtering, then spectral subtraction is used to suppress the background noise in the pass-band, which also reduces the occurrence of poultry sound distortion that may be caused by spectral subtraction (as shown in FIG. 8B).

In step S322, the segmentation unit 122 is configured for dividing the filtered recording information $I_{FR}$ into a plurality of sound information $I_S$. For example, the recording information $I_R$ and the filtered recording information $I_{FR}$ are files with a duration of 5 minutes of continuous recording, including many clips of normal poultry sounds, clips of abnormal poultry sound, clips of non-poultry sound, and clips with no sound. This makes it difficult to define the classification of the file, resulting in the loss of unity of the acoustic features in the subsequent extraction of the file. Therefore, it is necessary to divide the filtered recording information $I_{FR}$ and reduce the number of poultry sounds contained in a single information file. In some embodiments, the method for implementing step S322 includes, but is not limited to, Voice Activity Detection (VAD), autocorrelation function (ACF) or other voice feature identification methods.

Figure 9:
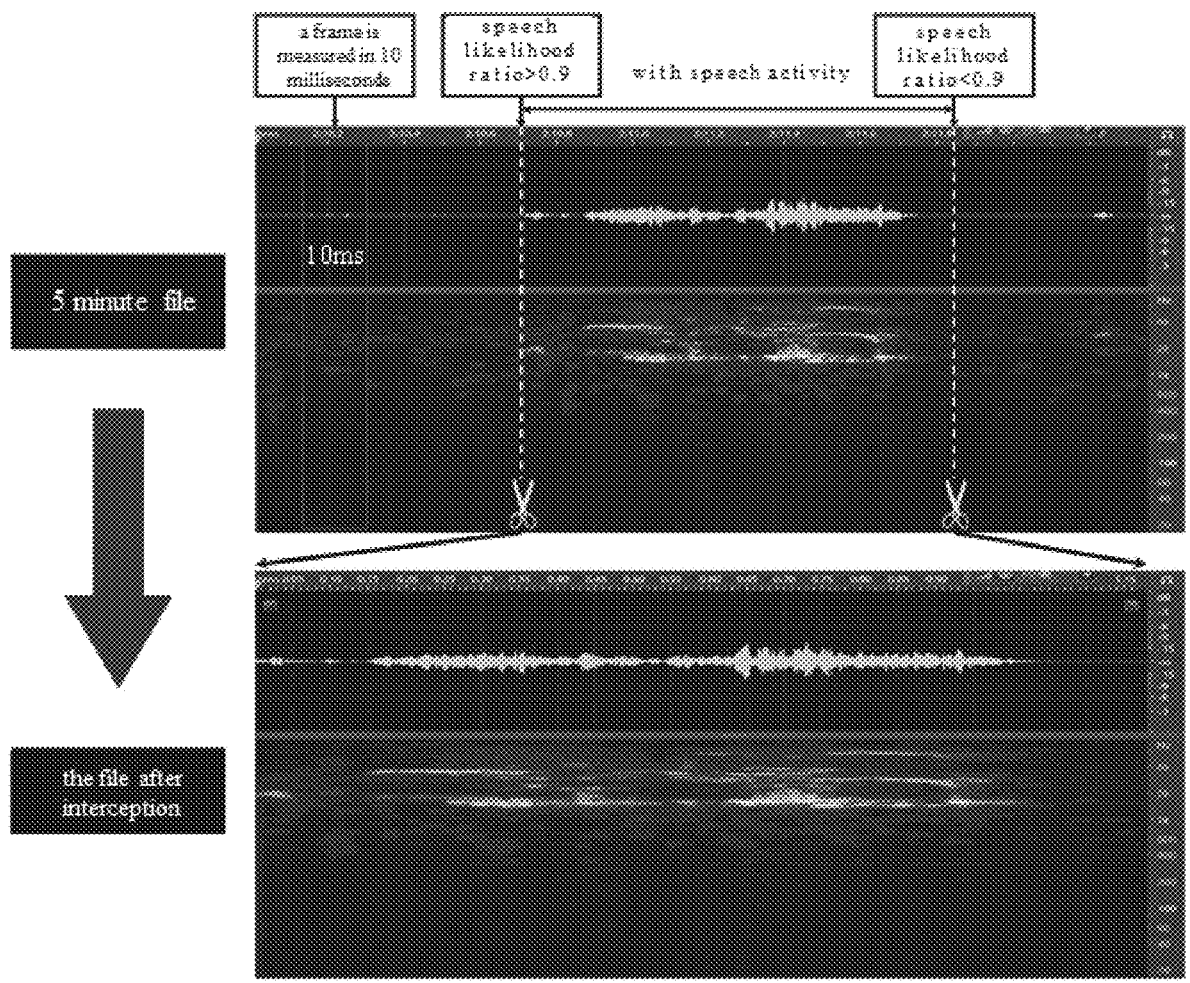
FIG. 9 shows a schematic diagram of a voice activity part intercepted by a VAD according to an embodiment of the present disclosure.

In some embodiments, the step S322 is implemented through voice activity detection (VAD). Voice activity detection is based on a frame length of 10 milliseconds and is characterized by the energy of several sub-bands. Taking six sub-bands as an example, these sub-bands are 80-250 Hz, 250-500 Hz, 500-1000 Hz, 1-2 kHz, 2-3 kHz, and 3-4 kHz. VAD detects the entire filtered recording information $I_{FR}$ and calculates the probability of each frame being speech or noise, respectively. The final criterion for determining speech activity is that the total likelihood ratio for any one or all six sub-bands is greater than 0.9. In addition, when speech activity is detected, the program starts recording and continues until the likelihood ratio drops below 0.9, indicating the end of speech activity. The recorded segment is then extracted to form a shorter audio file, typically within 2 seconds. Referring to FIG. 9, the number of poultry sounds in this extracted sound information $I_S$ is relatively small. Compared to the original 5-minute recording information $I_R$ and the filtered recording information $I_{FR}$, the sound information $I_S$ is more specific and can classify poultry sounds more accurately.

In particular, after the recording information $I_{FR}$ is divided into frames according to the above method, and then the frames are transformed into a frequency domain via the Fourier transform. The frequency band of each frame is further divided into several sub-bands. The intensity distribution of the entire frequency band, the intensity distribution of each sub-band, and the likelihood ratio of the mixed Gaussian model of speech and noise are compared. When the likelihood ratio of the mixed Gaussian model of speech is higher than 0.9, it is determined as speech. When the likelihood ratio of the mixed Gaussian model of noise is higher than 0.9, it is determined as noise. In other words, the present disclosure can estimate the likelihood ratio by combining the "intensity distribution" of the frequency band energy with the speech and noise mixed Gaussian model in the frequency domain.

Furthermore, because almost all background noises are composed of high-density sounds, it is difficult to identify them through the human eye on the frequency spectrum. With the noise reduction filtering, the distant and indistinguishable sounds can be removed. After the noise reduction is performed, there may still be ambiguous poultry sound spectrums between the clear poultry sounds and the indistinguishable poultry sounds. Then, the segmentation step (for example, step S322) in the frequency domain can be used for analyzing the distribution of each intensity in different frequency bands and avoiding cutting out indistinguishable non-poultry sounds which are difficult to identify. Therefore, a preliminary screening of the poultry sounds (i.e., the sounds emitted from the throat) and non-poultry sounds (i.e., the sounds not produced from the throat) can be performed simultaneously.

Moreover, there are significant differences in frequency spectrum composition between sounds such as object collision sound and friction sounds and the animal sounds. If the segmentation step is performed directly based on the energy intensity in the time domain, it is easy to cut out non-poultry sounds (i.e., the sounds not produced from the throat), which will increase the cost of subsequent processing. Therefore, when the segmentation step is only performed through the time-domain signal, a time limit (such as the minimum period of time and the maximum period of time) is usually added at the same time to reduce e the collection of invalid data. In contrast, when the present disclosure performs the segmentation step (such as step S322) in the frequency domain (rather than directly in the time domain), a preliminary screening of the poultry sounds (i.e., the sounds emitted from the throat) and the non-poultry sounds (i.e., the sounds not produced from the throat) can be performed simultaneously. Therefore, the pre-processing of sound signals has a beneficial effect on the effective identification of poultry sounds with a high stocking density.

The term "frequency domain" herein refers to mathematical representation of a signal or system in terms of its constituent frequencies in technical fields such as signal processing, telecommunications, and electrical engineering. In the frequency domain, signals or systems are represented as a sum of sinusoidal waves of different frequencies, amplitudes, and phases. This means that the signal's amplitude and phase are defined as a function of frequency. In the frequency domain, the signal can be viewed as a spectrum that shows how much of the signal's energy is contained at different frequencies.

The term "time domain" herein refers to a mathematical representation of a signal or system as a function of time in technical fields such as signal processing, telecommunications, and electrical engineering. In the time domain, signals or systems are represented as variations over time. This means that the signal's amplitude and phase are defined as a function of time. In the time domain, the signal can be viewed as a waveform that changes over time, and the behavior of the signal can be analyzed by observing its changes over time.

In addition, referring to the following table 1, table 1 shows that it has better sound interception results through spectral subtraction performed after band-pass filtering, compared with only using band-pass filtering or only using spectral subtraction.

TABLE 1

| | original recording information | after band-pass filtering | after spectral subtraction | spectrum subtraction is performed after band-pass filtering |
|---|---|---|---|---|
| total number of intercepted sounds (number) | 13 | 95 | 8 | 259 |
| average file length (seconds) | 0.303 | 0.372 | 0.233 | 0.456 |

In step S323, the extraction unit 123 is configured for extracting a plurality of sound features $C_S$ from the plurality of sound information $I_S$. When analyzing a piece of audio file, short-term analysis is usually used because the amount of variation in audio files is large and the recording environment of this study is in commercial poultry houses, thus the contents of the audio files are more complex. Therefore, short-time data analysis is relatively stable, and short-time analysis usually calculates the feature values for a piece of audio file content using frames (length around 30 milliseconds) as a unit. The step S323 may further comprises a feature acquisition method, a feature conversion method or a feature extraction method. In some embodiments, the feature acquisition method in step S323 includes but not limited to signal conversion (such as wavelet analysis, power spectral density (PSD)), openSMILE human emotion feature set, process Zero-crossing rate (ZCR), short-time Fourier transform, fast Fourier transform (FFT) (such as energy intensity, fundamental frequency), Mel-frequency cepstral coefficient (MFCC), Cepstral peak prominence (CPP) and Welchz method. In some embodiments, the methods for implementing the feature transformation in step S323 include but not limited to standardization, normalization, binarization or other ways of numerical transformation, scaling, and function transformation. In some embodiments, the methods for implementing the feature extraction in step S323 include but are not limited to principal component analysis (PCA), linear discrimination analysis (LDA), local linear embedding (LLE), Laplacian eigenmap (LE), Stochastic Neighbor Embedding (SNE), T-Stochastic Neighbor Embedding (T-SNE), kernel principal components analysis (KPCA), transfer component analysis (TCA) or other feature dimensionality reduction and feature extraction methods.

In some embodiments, openSMILE is used for performing the step S323. OpenSMILE is an open-source toolkit for signal processing and audio acoustic feature extraction. "The INTERSPEECH 2009 Emotion Challenge feature set" is used in the embodiment. In addition, a total of 384 acoustic features are extracted from each audio file and include root-mean-square signal frame energy, Mel-Frequency cepstral coefficients 1-12, zero-crossing rate of time signal, the voicing probability computed from the ACF, the fundamental frequency computed from the Cepstrum and so on, wherein there are a total of 16 low-level descriptors (LLDs).

Mel-Frequency cepstral coefficients (MFCCS) are a group of key coefficients used to establish the Mel-Frequency cepstral, and the Mel-Frequency cepstral is a spectrum used for representing a short-term audio file based on the logarithmic spectrum represented by a non-linear Mel scale and its linear cosine transform. Its main feature is that the frequency bands on the Mel-Frequency spectrum are evenly distributed on the Mel scale, and this representation method is closer to the human nonlinear auditory system. Due to this acoustic characteristic, which takes into account the human ear's sensitivity to different frequencies, it is particularly suitable for speech detection. Wherein, the conversion between the Mel scale (m) and the actual frequency (f) can be expressed as the following equation (3), where f is the actual frequency value. The reference point thereof defines 1000 Hz as 1000 mel.

$$m = 2595\log\left(1 + \frac{f}{700}\right) \quad (3)$$

In step S330, the artificial intelligence sound model 160 is configured for generating a training set T according to the plurality of sound features $C_S$. The artificial intelligence sound model 160 is configured for using the training set T to train the feature analysis module 130. The training set T includes a recognition condition recording the normal poultry vocal state, the abnormal poultry vocal state and the non-poultry vocal state. In some embodiments, the methods for implementing the step S330 include but not limited to supervised learning, un-supervised learning, semi-supervised learning and reinforcement learning. Supervised learning includes but not limited to classification and regression, wherein classification includes but not limited to random forest, K-nearest neighbor algorithm (k-NN), support vector machine (SVM), artificial neural network (ANN), support vector domain description (SVDD), sparse representation classifier (SRC). Unsupervised learning includes, but is not limited to, clustering and dimensionality reduction.

Figure 10A:
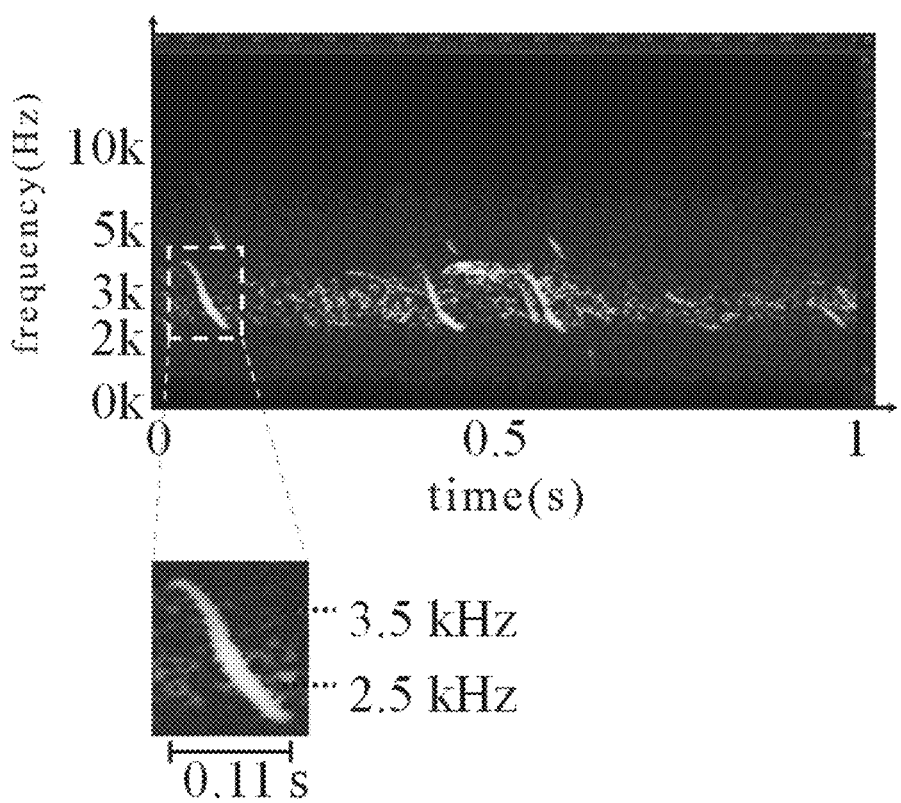
FIG. 10A shows a sample of normal poultry sounds of a native chicken according to an embodiment of the present disclosure.
Figure 10B:
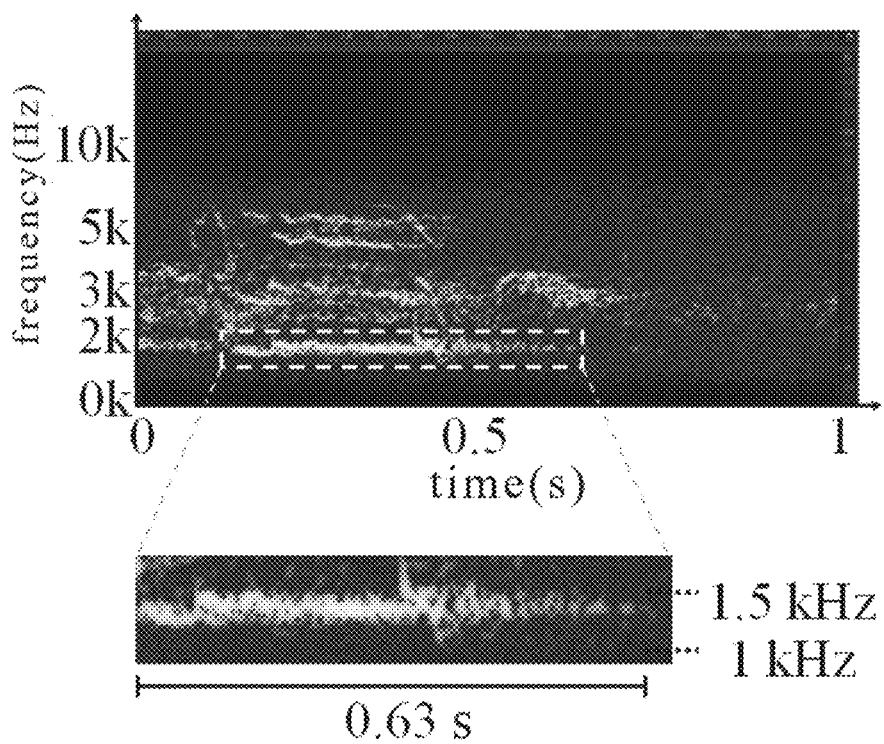
FIG. 10B shows a sample of abnormal poultry sounds of a native chicken according to an embodiment of the present disclosure.

For example, referring to FIG. 10A to FIG. 10B, normal poultry sounds and abnormal poultry sounds collected in an experiment are shown. As shown in FIG. 10A, FIG. 10A shows the normal sound data of 20-day-old native chickens. It has been confirmed by practitioners that the normal sound frequency of native chickens is between about 2.5 kHz and about 3.5 kHz, and the duration of a single sound thereof lasts about 0.1 second. As shown in FIG. 10B, the abnormal sound data of 20-day-old chickens are shown. The frequency of the abnormal sound is between about 1 kHz and about 1.5 kHz, and the duration of a single sound thereof lasts about 0.67 seconds to 0.7 seconds. It has been confirmed by practitioners that this abnormal sound is a symptom of rales, one of which is characterized by an elongated sound condition caused by an excessive blockage of mucus in the trachea.

Figure 11A:
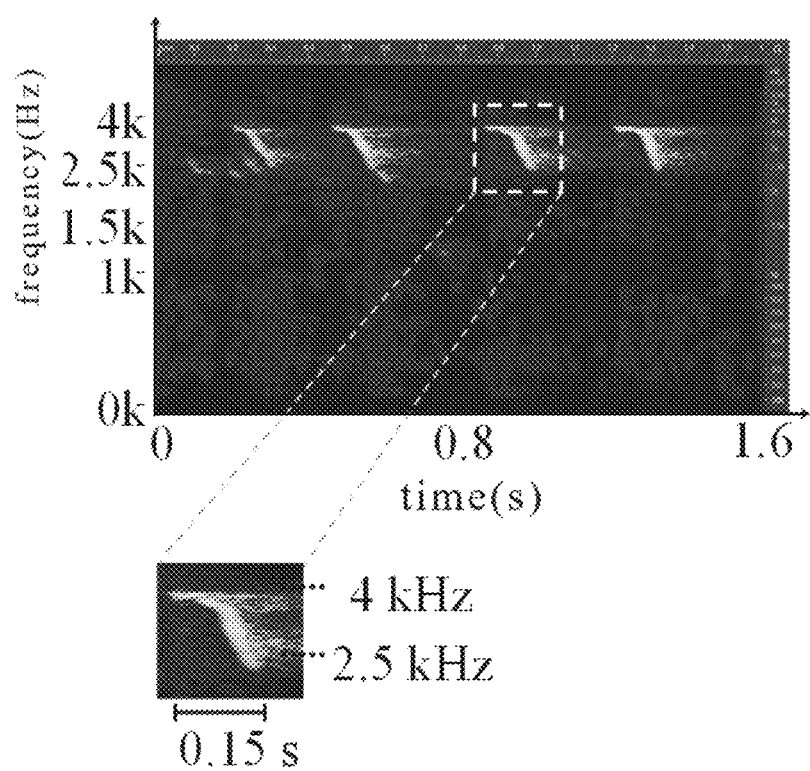
FIG. 11A shows a sample of normal poultry sounds of laying hens according to an embodiment of the present disclosure.
Figure 11B:
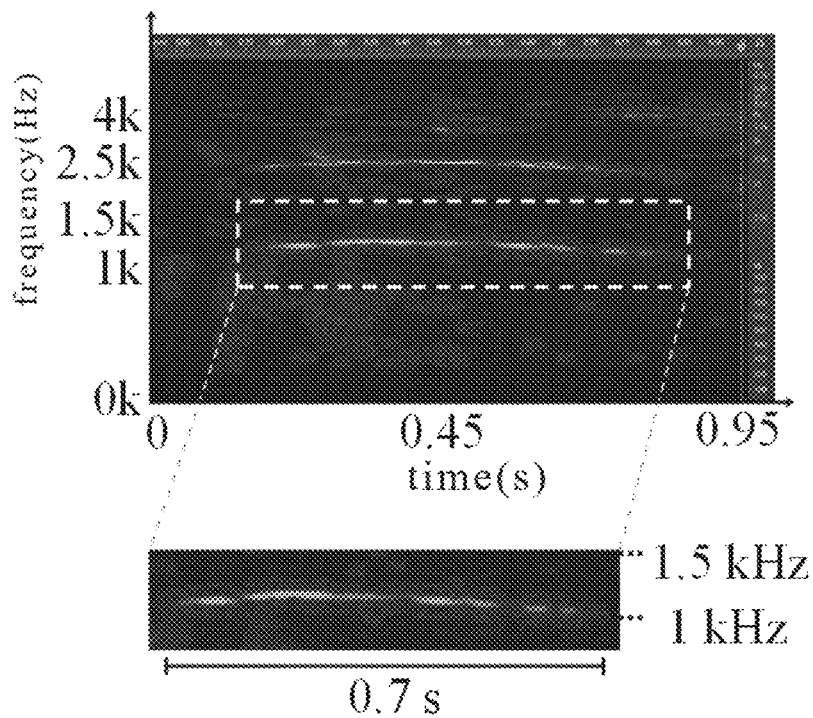
FIG. 11B shows a sample of abnormal poultry sounds of laying hens according to an embodiment of the present disclosure.

In addition, referring to FIG. 11A to FIG. 11B, the normal poultry sounds and abnormal poultry sounds collected in another experimental example is shown. As shown in FIG. 11A, FIG. 11A shows the normal sound data of 19-day-old native chicken. It has been confirmed by practitioners that the normal sound frequency of native chicken is between about 2.5 kHz and about 4 kHz, and the duration of a single sound thereof lasts about 0.15 seconds. As shown in FIG. 11B, FIG. 11B shows the abnormal sound data of 20-day-old chickens, the frequency of the abnormal sound is between about 1 kHz and about 1.5 kHz, and the duration of a single sound thereof lasts about 0.7 seconds. It has been confirmed by practitioners that this abnormal sound is a symptom of rales, one of which is characterized by an elongated sound condition caused by an excessive blockage of mucus in the trachea.

As shown in FIG. 10A to FIG. 11B, the difference in frequency between normal and abnormal poultry sounds is about 2 kHz, and the difference in duration of sound is about 0.5 second to 0.6 second. Therefore, for example, the identification condition in step S330 can be set according to the frequency difference or duration difference of the sound.

Figure 12:
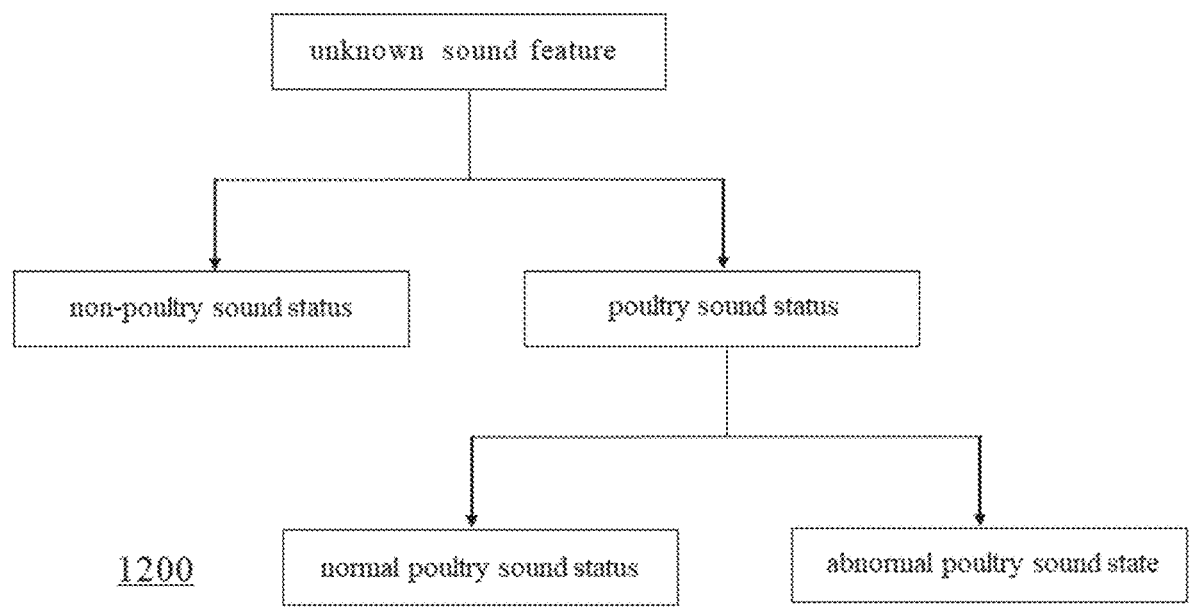
FIG. 12 shows a schematic diagram of classification of a support vector machine according to an embodiment of the present disclosure.
Figure 13:
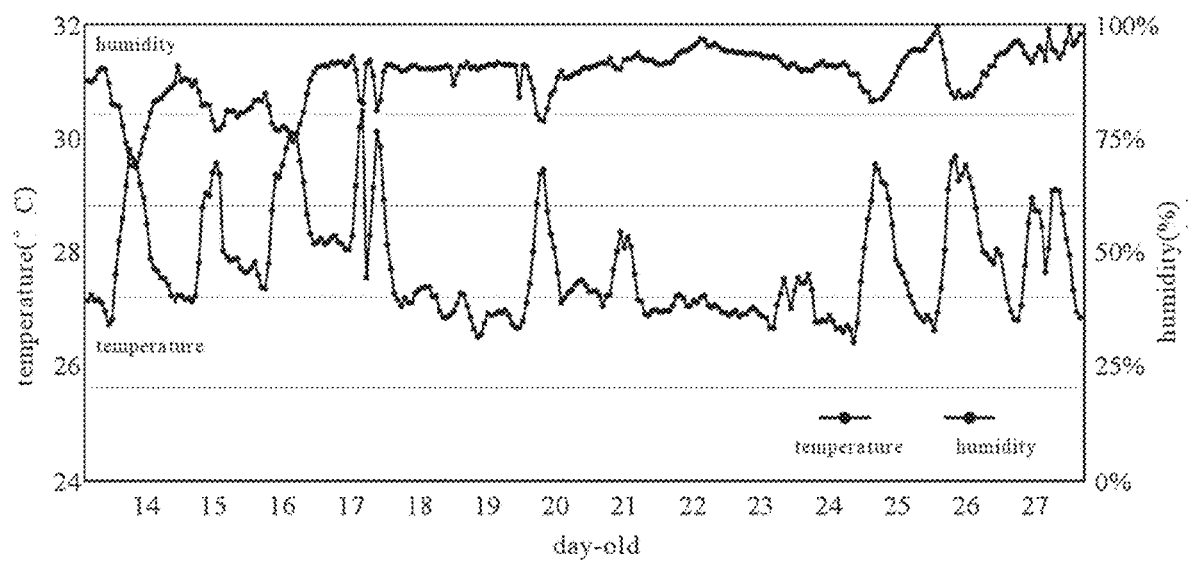
FIG. 13 shows the temperature and humidity information in each-day-old poultry house according to an embodiment of the present disclosure.

Referring to FIG. 12, FIG. 12 shows a classification diagram 1200 of a support vector machine according to an embodiment of the present disclosure. The artificial intelligence sound model 160 classifies each of the plurality of sound features $C_S$ as a poultry sound state or a non-poultry sound state through a support vector machine, if one of the plurality of sound features belongs to the poultry sound state, the artificial intelligence sound model classifies said one of the plurality of sound features belonging to the poultry sound state as the normal poultry sound state or the abnormal poultry sound state through the support vector machine.

In some embodiments, the artificial intelligence sound model 160 uses 150 normal poultry sound data, 150 abnormal poultry sound data and 150 non-poultry sound data for model training. The data of these three types of training sets are shown in Table 2. The trained artificial intelligence sound model 160 has a verification accuracy of 84.2% in identifying the three types of data through the confusion matrix and 10-fold cross-validation. The verification results of the artificial intelligence sound model 160 are shown in Table 3.

TABLE 2

| | poultry species | sound condition | collection sources of sound data | collection time of sound data |
| --- | --- | --- | --- | --- |
| normal poultry sound | red feather native chicken | general poultry sound | during the feeding week in a commercial poultry house | 26-day-old |

TABLE 2-continued

| | poultry species | sound condition | collection sources of sound data | collection time of sound data |
|---|---|---|---|---|
| abnormal poultry sounds | SPF laying hens | elongated sound condition of the rales of poultry | during challenge tests conducted in laboratory poultry houses | 20-day-old |
| non-poultry sound | (none) | poultry pecking at the wall, the sound of wings and rain | commercial poultry house | throughout the feeding week |

TABLE 3

| | | forecast condition | | |
|---|---|---|---|---|
| model verification result | | normal poultry sound | abnormal poultry sound | non-poultry sound |
| actual situation | normal poultry sound | 120 | 1 | 29 |
| | abnormal poultry sound | 3 | 144 | 3 |
| | non-poultry sound | 35 | 0 | 115 |

In step S340, the feature analysis module 130 is configured for analyzing and determining a sound state Ss of each of the plurality of sound features $C_S$. In some embodiments, an artificial intelligence sound model 160 is used (as shown in step S330) in the step of analyzing each of the plurality of sound features $C_S$ to determine the sound state Ss of each of the plurality of sound features $C_S$.

In step S350, the sound state Ss of the recording information $I_R$ (or the sound state Ss of each of the plurality of sound features $C_S$) is stored in a database 140 through a network. In some embodiments, the database 140 is a cloud database for storing historical information of the sound state Ss.

In step S360, a user interface is provided for allowing a user to observe the sound status Ss in the database 140 through the network.

Figure 14:
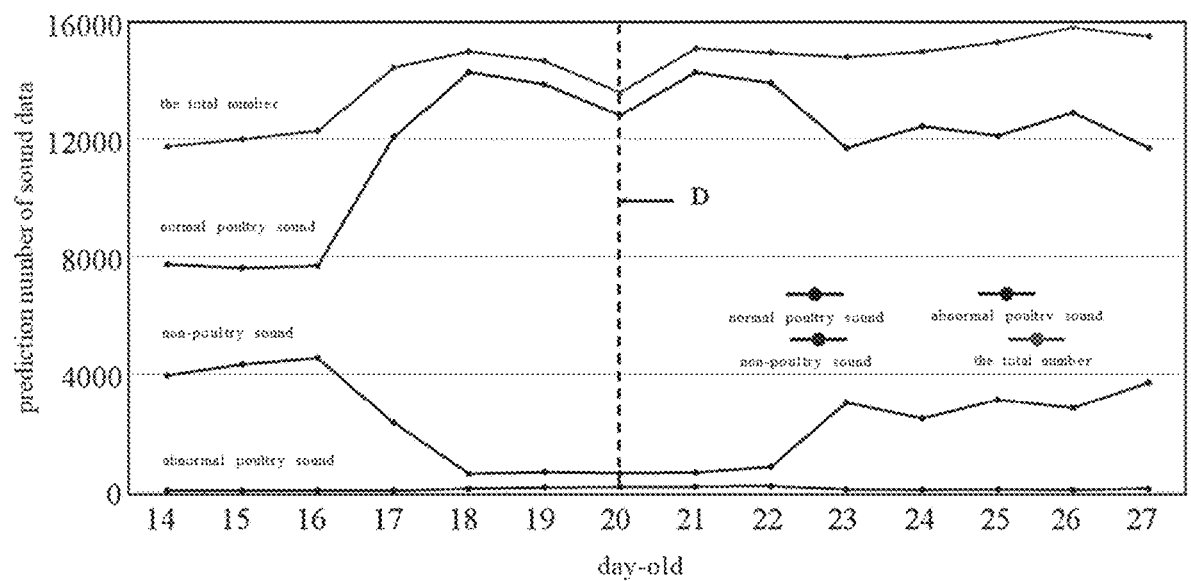
FIG. 14 shows a prediction result of the number of sound data of each-day-old poultry according to an embodiment of the present disclosure.
Figure 15:
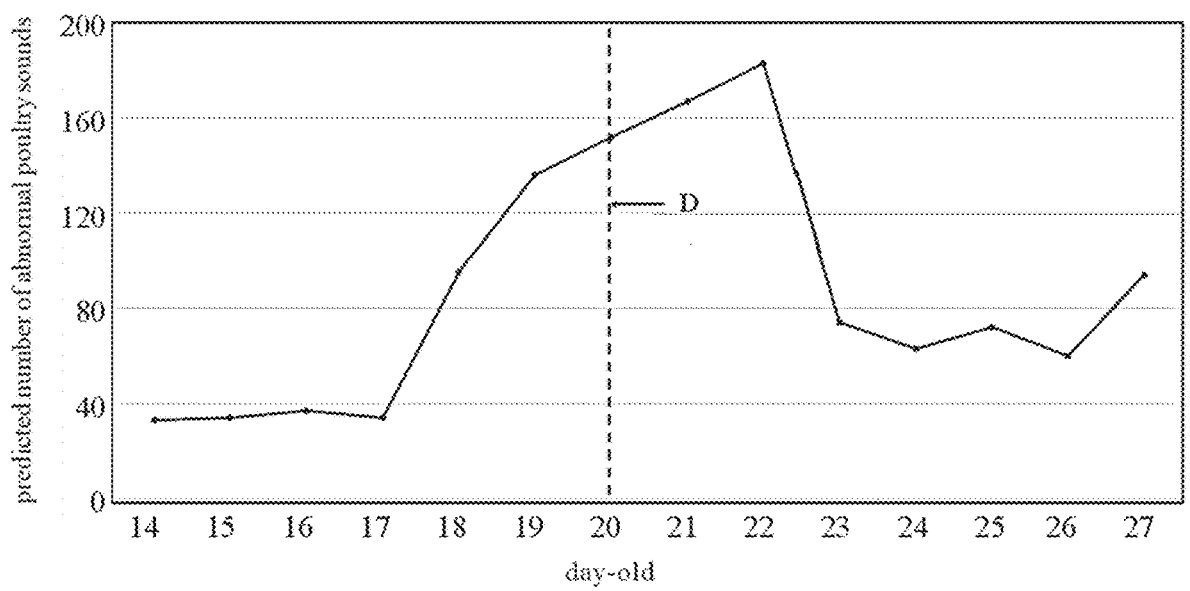
FIG. 15 shows a prediction result of the number of abnormal poultry sounds of each-day-old poultry according to an embodiment of the present disclosure.
Figure 16:
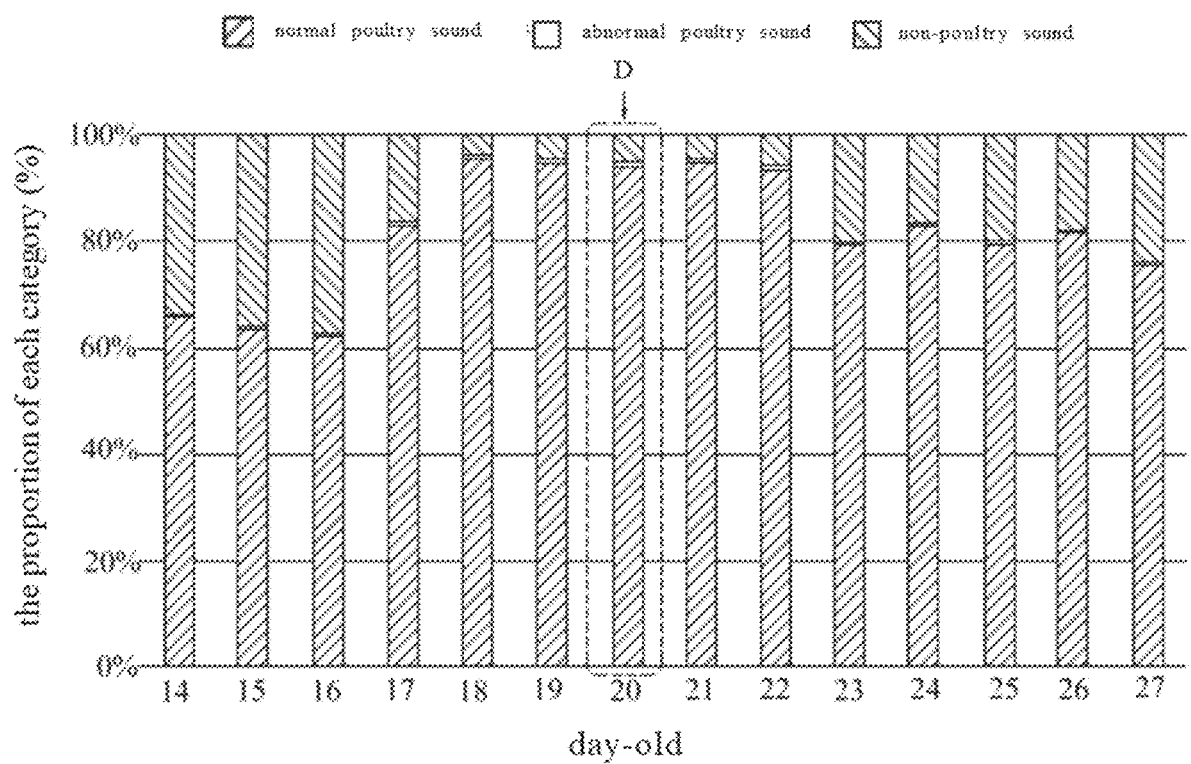
FIG. 16 shows the proportion of each category according to an embodiment of the present disclosure to the prediction results of the day.

Referring to FIG. 13 to FIG. 16, FIG. 13 shows the temperature and humidity information in the poultry house for each-day-old poultry according to an embodiment of the present disclosure, FIG. 14 shows a predicted result of the number of sound data for each-day-old poultry according to an embodiment of the present disclosure, FIG. 15 shows a predicted result of the number of abnormal poultry sounds for each-day-old poultry according to an embodiment of the present disclosure, and FIG. 16 shows the proportion of each category of an embodiment the present disclosure to the predicted results of the day. The day of abnormal condition observed by humans D shown in FIGS. 14 to 16 represents the day when practitioners observed abnormal poultry sounds (such as the condition of rales in poultry), and the day of abnormal condition observed by humans D is also applicable to the description of the subsequent drawings, which is illustrated first. As shown in FIG. 14 and FIG. 16, although the practitioner mentioned that some poultry had rales at 20-day-old, it is difficult to observe the change in the number of abnormal poultry sounds because the number of normal poultry sounds is much larger than that of abnormal poultry. As shown in FIG. 15, after the changes in the number of abnormal poultry sounds independently are sorted out, it can be seen that the proportion of abnormal poultry sounds increases significantly at 18-day-old and declines at 23-day-old.

Figure 17A:
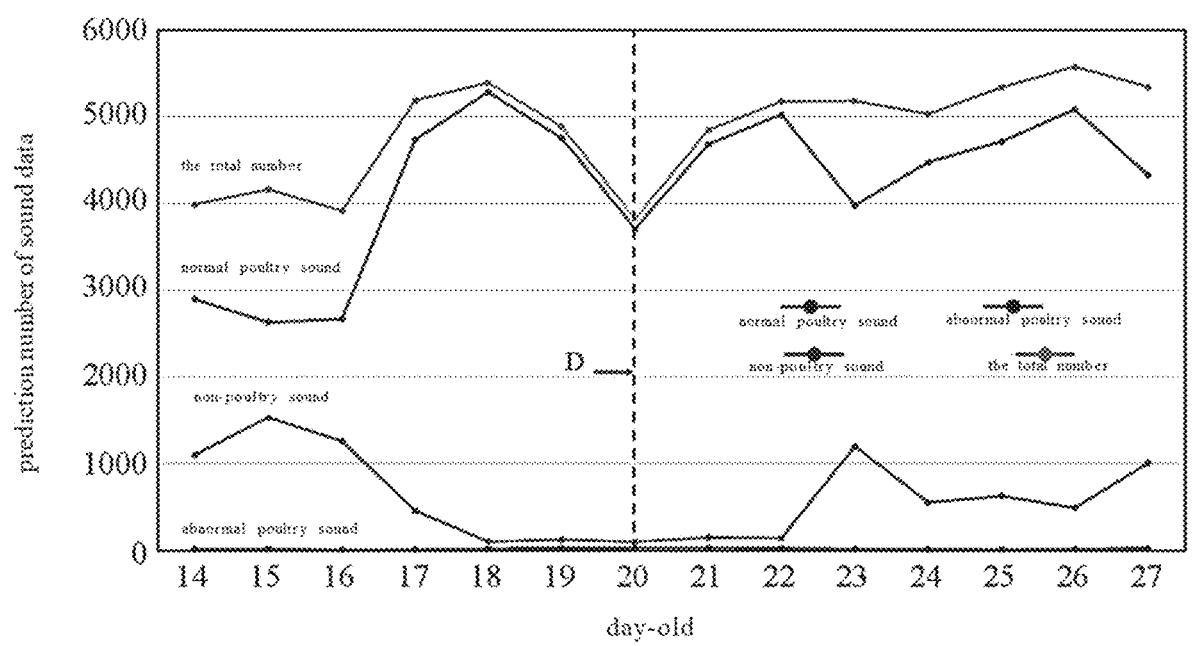
FIG. 17A shows a prediction result of the number of voice data from 6:00 am to 2:00 pm for each-day-old poultry according to an embodiment of the present disclosure.
Figure 17B:
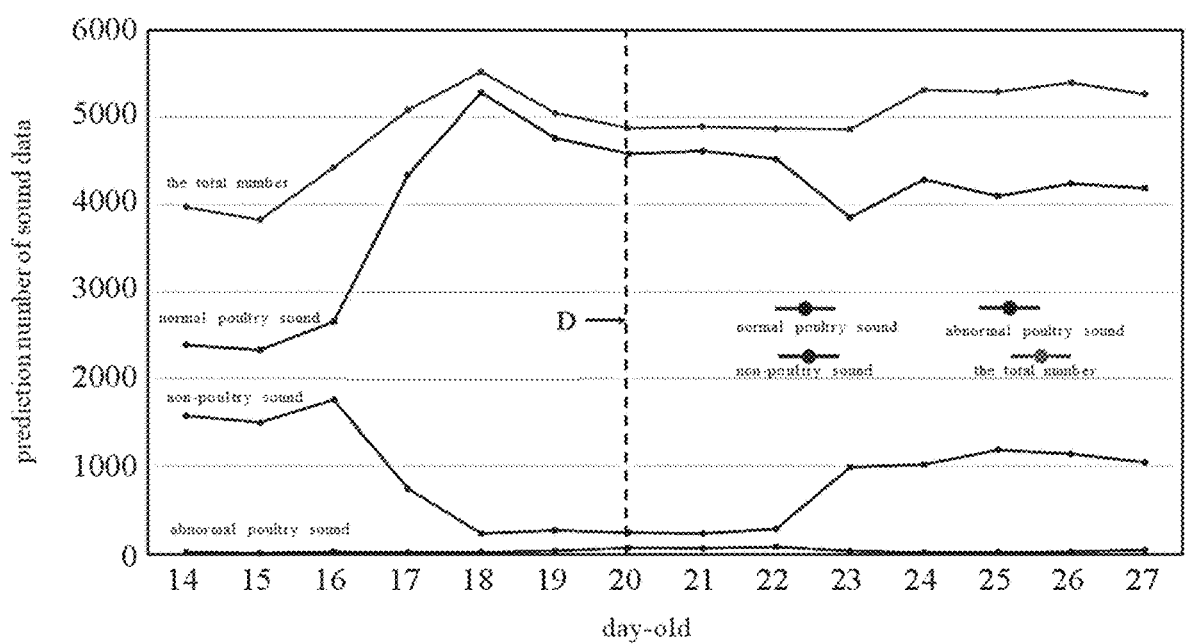
FIG. 17B shows a prediction result of the number of voice data from 2:00 pm to 10:00 pm for each-day-old poultry according to an embodiment of the present disclosure.
Figure 17C:
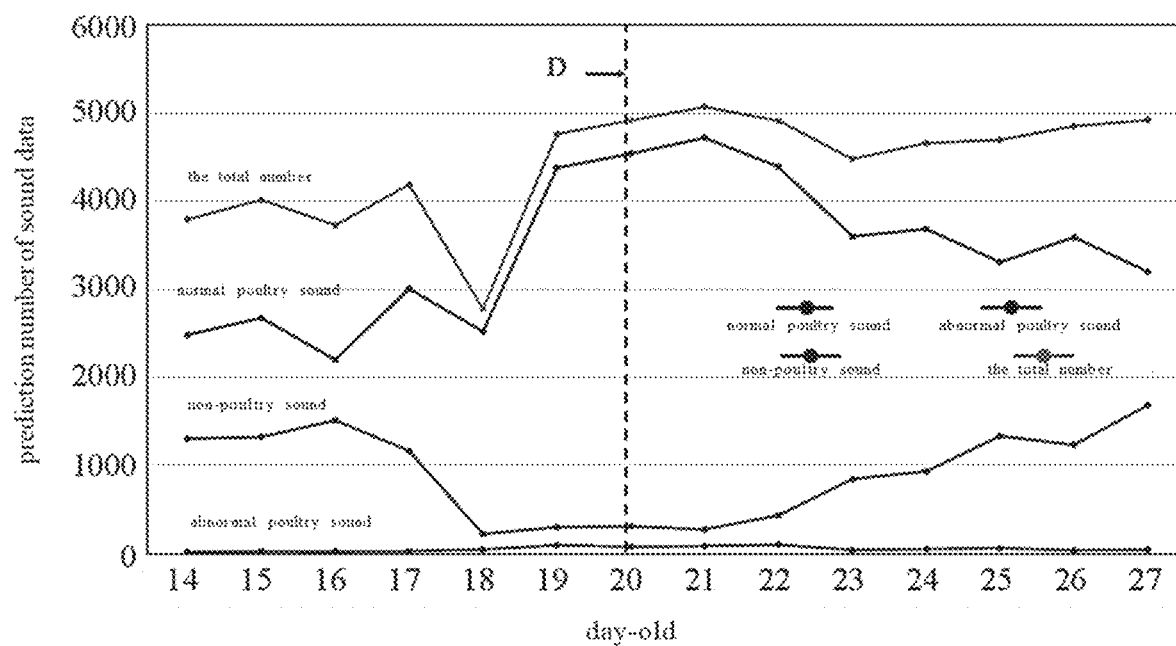
FIG. 17C shows a prediction result of the number of sound data from 10:00 pm to 6:00 am of the next day according to an embodiment of the present disclosure.

Referring to FIG. 17A to FIG. 17C, FIG. 17A shows a prediction result of the number of sound data from 6 am to 2 pm for each-day-old poultry according to an embodiment of the present disclosure, FIG. 17B shows a prediction result according to an embodiment of the present disclosure, and FIG. 17C shows a prediction result of the number of sound data from 10:00 p.m. to 6:00 a.m. of the next day according to an embodiment of the present disclosure.

Figure 18A:
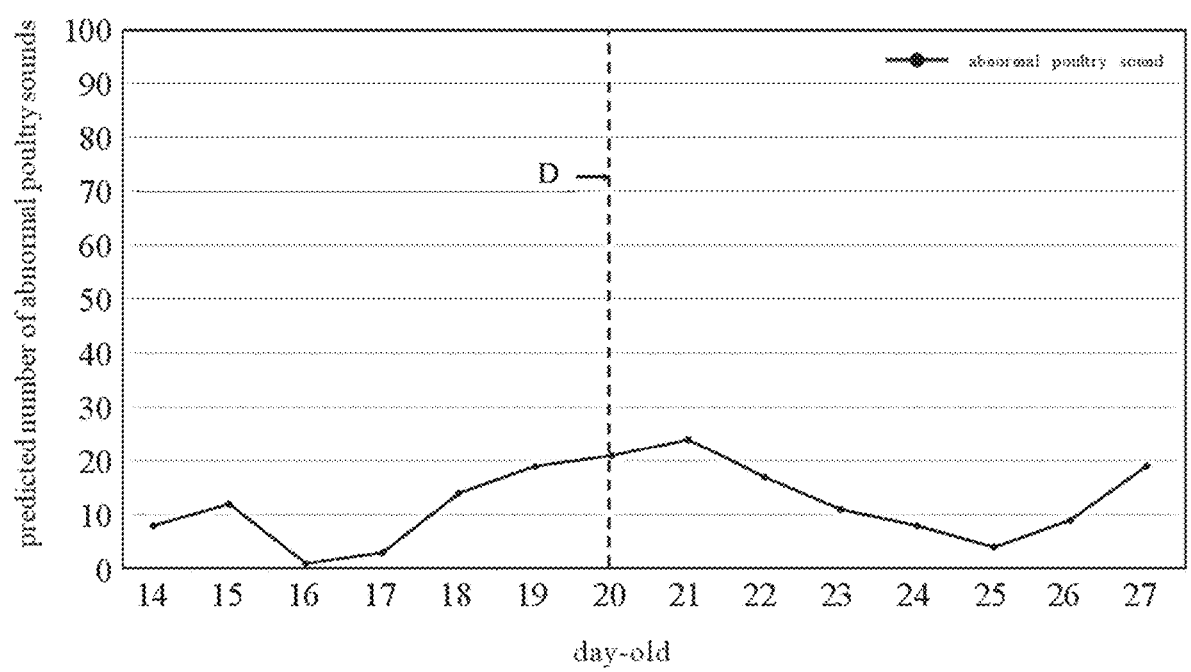
FIG. 18A shows a prediction result of the number of abnormal poultry sound data from 6:00 am to 2:00 pm for each-day-old poultry according to an embodiment of the present disclosure.
Figure 18B:
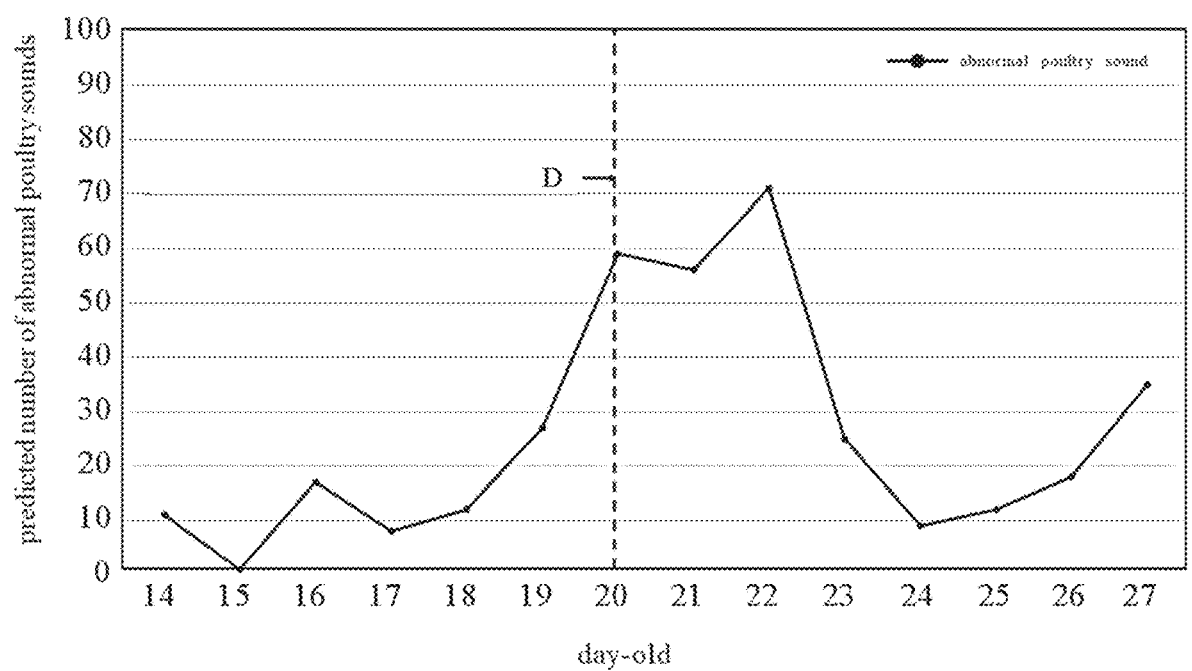
FIG. 18B shows a prediction result of the number of abnormal poultry sound data from 2:00 pm to 10:00 pm for each-day-old poultry according to an embodiment of the present disclosure.
Figure 18C:
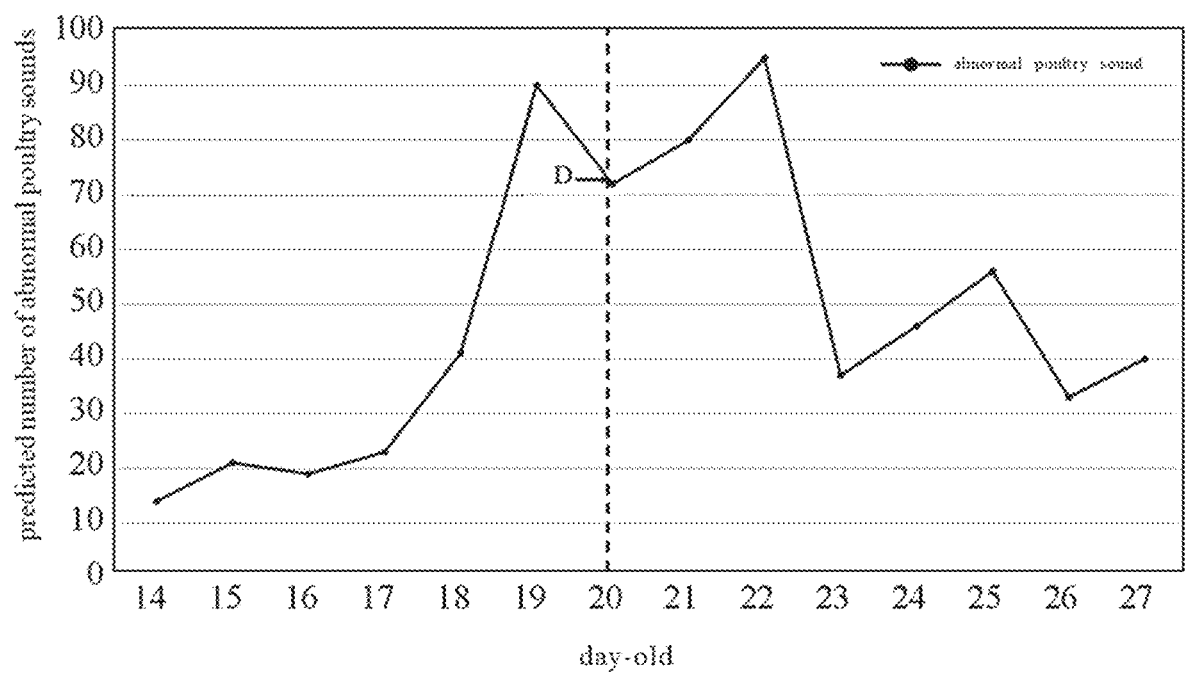
FIG. 18C shows a prediction result of the number of abnormal poultry sound data from 10:00 pm to 6:00 am of the next day for each-day-old poultry according to an embodiment of the present disclosure.

Furthermore, the number of abnormal poultry sounds is independently sorted out. Referring to FIG. 18A to FIG. 18C, FIG. 18A shows a prediction result of the abnormal poultry sounds from 6:00 am to 2:00 pm at each-day-old poultry according to an embodiment of the present disclosure, FIG. 18B shows a prediction result of abnormal poultry sound data from 2:00 p.m. to 10:00 p.m. for each-day-old poultry according to an embodiment of the present disclosure. FIG. 18C shows a prediction result of abnormal poultry sound data from 10 p.m. to 6 a.m. for each-day-old poultry according to an embodiment of the present disclosure. In this embodiment, it has been confirmed by practitioners that the accuracy rate of identifying abnormal poultry sounds from approximately 12,000 sound data per day during the two-week period was 99.3%. Therefore, the prediction results of the system and method proposed in the present disclosure for abnormal poultry sounds can be provided to a user (e.g., a practitioner) as a basis for assessing the health status of poultry. In addition, compared to practitioners observing abnormal poultry sounds at 20-day-old, the system and method proposed in the present disclosure can detect abnormal poultry sounds at 18-day-old in the embodiment, which can help users (e.g. practitioners) to take action more quickly.

According to some embodiments, the present disclosure discloses a poultry voiceprint identification system and method, which can receive a recording information of a poultry house for a period of time, and convert the recording information into images (for example, plane images such as waveforms or time-frequency graphs), analyze the recording information according to multiple image indicators of the images (for example, identification conditions such as frequency difference or duration difference) to determine the sound state of the recording information, and the sound state includes a normal poultry sound state and/or an abnormal poultry sound state. According to some embodiments, the above-mentioned step of analyzing the recording information according to the plurality of image indicators of the images to determine the sound state of the recording information can also be implemented in combination with an artificial intelligence sound model.

Based on the poultry voiceprint identification system and method in the embodiments of the present disclosure, even if a lot of mixed sound recording information in the poultry house are received, the poultry voiceprint identification system and method can accurately and quickly identify the production of abnormal poultry sounds through the improvement of computer software/hardware and combined with the artificial intelligence sound model.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A poultry voiceprint identification method, comprising steps of:
receiving a recording information of a poultry house for a period of time, wherein a stocking density of poultry in the poultry house is equal to or greater than 7 per square meter;
converting the recording information into a plurality of sound features, wherein the step of converting the recording information into the plurality of sound features comprises steps of:
filtering out the recording information to generate a filtered recording information with a specific frequency range;
dividing the filtered recording information into a plurality of sound information with speech activities detected from the filtered recording information;
forming a plurality of audio files from the plurality of sound information; and
extracting the plurality of sound features from the plurality of audio files;
classifying each of the plurality of sound features as a poultry sound state associated with a poultry sound or a non-poultry sound state associated with a non-poultry sound; and
analyzing each of the plurality of sound features to determine a sound state of one of the plurality of sound features belonging to the poultry sound state through an artificial intelligence sound model, wherein the sound state includes a normal poultry sound state or an abnormal poultry sound state.

2. The poultry voiceprint identification method according to claim 1, wherein the step of filtering the recording information to generate the filtered recording information with the specific frequency range is implemented by band-pass filtering and spectral subtraction.

3. The poultry voiceprint identification method according to claim 1, wherein the step of extracting the plurality of sound features from the plurality of audio files is implemented by openSMILE, Wavelet or short-time distance Fourier transform.

4. The poultry voiceprint identification method according to claim 1, further comprising steps of:
storing the sound state of the recording information in a database through a network; and
providing a user interface for allowing a user to observe the sound status in the database through the network.

5. The poultry voiceprint identification method according to claim 1, wherein the step of analyzing each of the plurality of sound features to determine the sound state of each of the plurality of sound features is determined through an artificial intelligence sound model, wherein the artificial intelligence sound model is configured for generating a training set based on the plurality of sound features and using the training set to train the feature analysis module, wherein the training set includes a recognition condition recording the normal poultry sound state and the abnormal poultry sound state.

6. The poultry voiceprint identification method according to claim 5, wherein the artificial intelligence sound model classifies each of the plurality of sound features as the poultry sound state or the non-poultry sound state through a support vector machine, if one of the plurality of sound features belongs to the poultry sound state, the artificial intelligence sound model classifies said one of the plurality of sound features belonging to the poultry sound state as the normal poultry sound state or the abnormal poultry sound state through the support vector machine.

7. The poultry voiceprint identification method according to claim 1, wherein the speech activities are detected by a voice activity detection (VAD).

8. A poultry voiceprint identification system installed on a server connected to a network, comprising:
a receiver, arranged in a poultry house and configured to receive a recording information of a poultry house for a period of time, wherein a stocking density of poultry in the poultry house is equal to or greater than 7 per square meter;
a processor, coupled to the receiver to receive the recording information, wherein the processor is configured to:
filter out the recording information to generate a filtered recording information with a specific frequency range;
divide the filtered recording information into a plurality of sound information with speech activities detected from the filtered recording information;
form a plurality of audio files from the plurality of sound information;
extract a plurality of sound features from the plurality of audio files;
classify each of the plurality of sound features as a poultry sound state associated with a poultry sound or a non-poultry sound state associated with a non-poultry sound; and
analyze each of the plurality of sound features to determine a sound state of one of the plurality of sound features belonging to the poultry sound state, wherein the sound state includes a normal poultry sound state or an abnormal poultry sound state.

9. The poultry voiceprint identification system according to claim 8, wherein the processor is further configured to:
generate the filtered recording information with the specific frequency range by band-pass filtering and spectral subtraction.

10. The poultry voiceprint identification system according to claim 8, wherein the processor is further configured to:
extract the plurality of sound features from the plurality of audio files by openSMILE, Wavelet or short-time distance Fourier transform.

11. The poultry voiceprint identification system according to claim 8, wherein the poultry voiceprint identification system further comprises:
a database, configured to store the sound state of the recording information through the network
a user interface, configured to allow a user to observe the sound status in the database through the network.

12. The poultry voiceprint identification system according to claim 8, wherein the feature analysis module processor is further configured to:
use an artificial intelligence sound model to analyze each of the plurality of sound features to determine the sound state of each of the plurality of sound features, wherein the artificial intelligence sound model is configured to generate a training set based on the plurality of sound features and using the training set to train the feature analysis module, wherein the training set includes a recognition condition recording the normal poultry sound state and the abnormal poultry sound state.

13. The poultry voiceprint identification system according to claim 12, wherein the processor classifies each of the plurality of sound features as the poultry sound state or the non-poultry sound state through a support vector machine, if one of the plurality of sound features belongs to the poultry sound state, the artificial intelligence sound model classifies said one of the plurality of sound features belonging to the poultry sound state as the normal poultry sound state or the abnormal poultry sound state through the support vector machine.

14. The poultry voiceprint identification system according to claim 8, wherein the speech activities are detected by a voice activity detection (VAD).

* * * * *